US010606334B2

(12) United States Patent
Hashimoto

(10) Patent No.: US 10,606,334 B2
(45) Date of Patent: Mar. 31, 2020

(54) INFORMATION PROCESSING APPARATUS FOR DETERMINING LEVEL OF POWER SAVING OF PROCESSOR ACCORDING TO RETURN TIME NOTIFIED BY DEVICE CONNECTED TO PROCESSOR, AND POWER SAVING METHOD FOR PROCESSOR

(71) Applicant: CANON KABUSHIKI KAISHA, Tokyo (JP)

(72) Inventor: Minoru Hashimoto, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/201,908

(22) Filed: Nov. 27, 2018

(65) Prior Publication Data
US 2019/0094945 A1 Mar. 28, 2019

Related U.S. Application Data

(63) Continuation of application No. 15/599,216, filed on May 18, 2017, now Pat. No. 10,168,761.

(30) Foreign Application Priority Data

May 25, 2016 (JP) ................................ 2016-104430

(51) Int. Cl.
*G06F 15/00* (2006.01)
*G06K 15/00* (2006.01)
(Continued)

(52) U.S. Cl.
CPC .......... *G06F 1/3234* (2013.01); *G06F 1/3215* (2013.01); *G06F 1/3228* (2013.01);
(Continued)

(58) Field of Classification Search
CPC .... G06F 1/3234; G06F 1/3215; G06F 1/3228; G06F 1/3284; H04N 1/00891; H04N 2201/0094; Y02D 10/159
(Continued)

(56) References Cited

U.S. PATENT DOCUMENTS 9,465,646 B2 * 10/2016 Otomo .................. G06F 9/4887
10,168,761 B2 * 1/2019 Hashimoto ........... G06F 1/3228
(Continued)

FOREIGN PATENT DOCUMENTS

CN 101515976 A 8/2009
CN 103460189 A 8/2013
(Continued)

OTHER PUBLICATIONS

Shoichi Iizuka, et al. Stochastic Timing Error Rate Estimation under Process and Temporal Variation. 2015 IEEE International Test Conference (ITC), 2015, pp. 1-10, Institute of Electrical and Electronics Engineers (IEEE), Piscataway, NJ, USA.

*Primary Examiner* — Douglas Q Tran
(74) *Attorney, Agent, or Firm* — Canon U.S.A., Inc. IP Division

(57) ABSTRACT

An information processing apparatus includes a processor and a first device. The processor executes an operating system and a power control application, which operates on the operating system and controls a power mode of the information processing apparatus. The first device is connected to the processor to communicate with the processor, and notifies the operating system of a return time. The power control application notifies the first device of information indicating the power mode of the information processing apparatus. Based on the information notified by the power control application, the first device determines a return time of which the operating system is to be notified, and notifies the operating system of the determined return time. Based on the return time notified by the first device, the operating system determines a power saving state to which the processor is to shift, and shifts the processor to the determined power saving state.

15 Claims, 14 Drawing Sheets

(51) Int. Cl.
*G06K 1/00* (2006.01)
*G06F 1/3234* (2019.01)
*G06F 1/3228* (2019.01)
*H04N 1/00* (2006.01)
*G06F 1/3215* (2019.01)

(52) U.S. Cl.
CPC ....... *G06F 1/3284* (2013.01); *H04N 1/00891* (2013.01); *H04N 1/00933* (2013.01); *H04N 2201/0094* (2013.01); *Y02D 10/159* (2018.01)

(58) Field of Classification Search
USPC .............................. 358/1.14, 1.1, 1.13, 1.15
See application file for complete search history.

(56) References Cited

U.S. PATENT DOCUMENTS

| | | |
|---|---|---|
| 2005/0210312 A1 | 9/2005 | Maruichi |
| 2005/0240788 A1 | 10/2005 | Satoh |
| 2006/0190635 A1 | 8/2006 | Kojou |
| 2012/0106535 A1 | 5/2012 | Horiguchi |

FOREIGN PATENT DOCUMENTS

| | | |
|---|---|---|
| CN | 104580797 A | 4/2015 |
| CN | 104781755 A | 7/2015 |

\* cited by examiner

STANDBY MODE (ACTIVE)

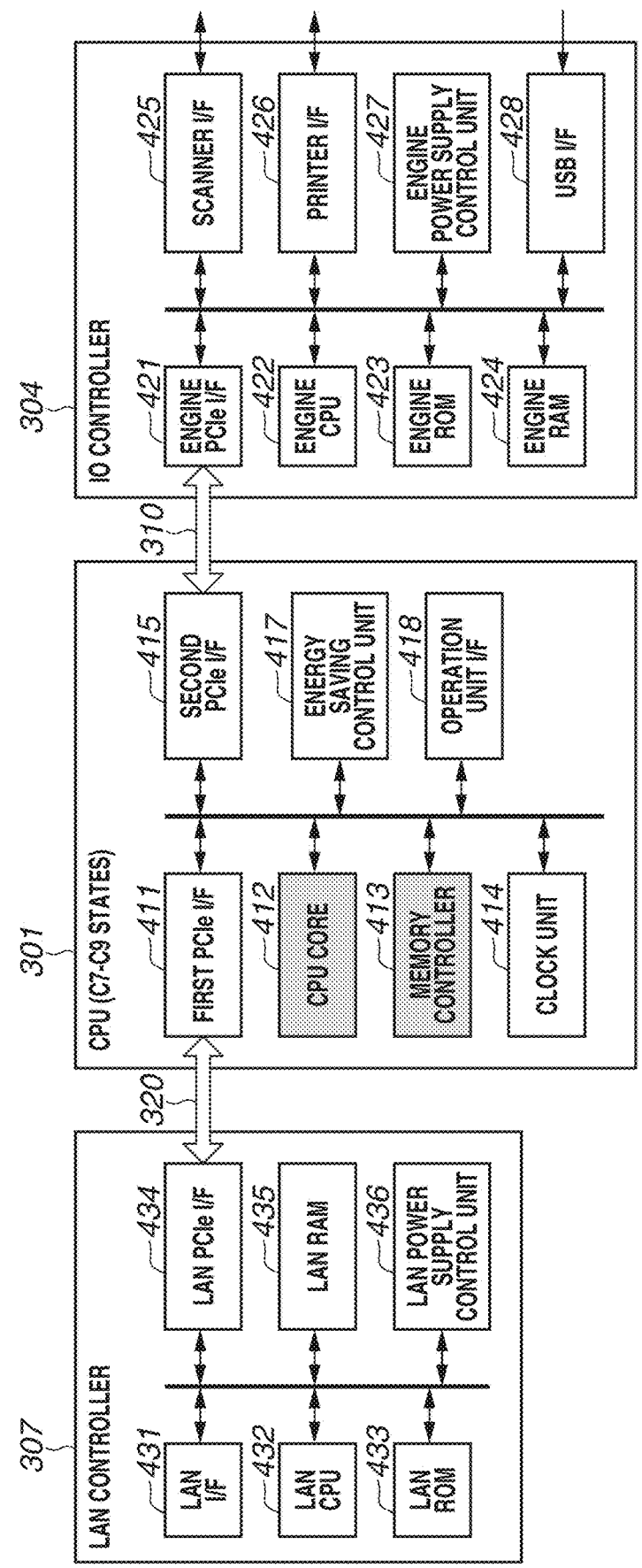

WAITING RESPONSE MODE (ACTIVE)

WAITING RESPONSE MODE (LOW POWER)

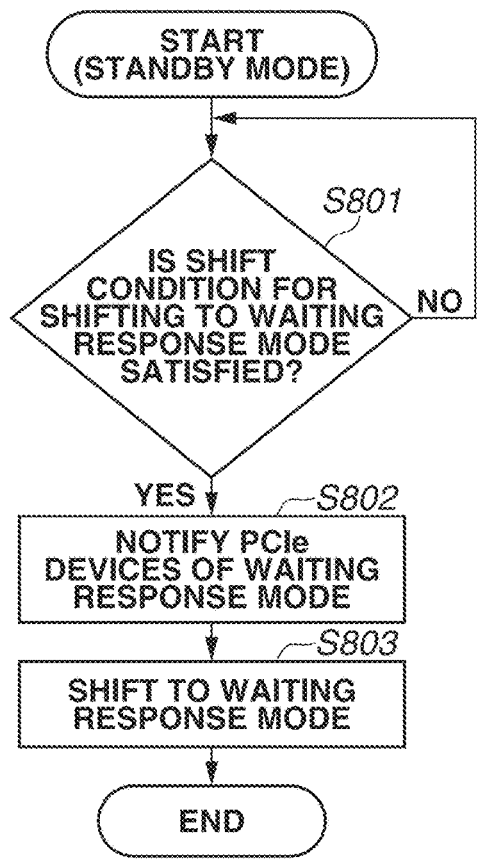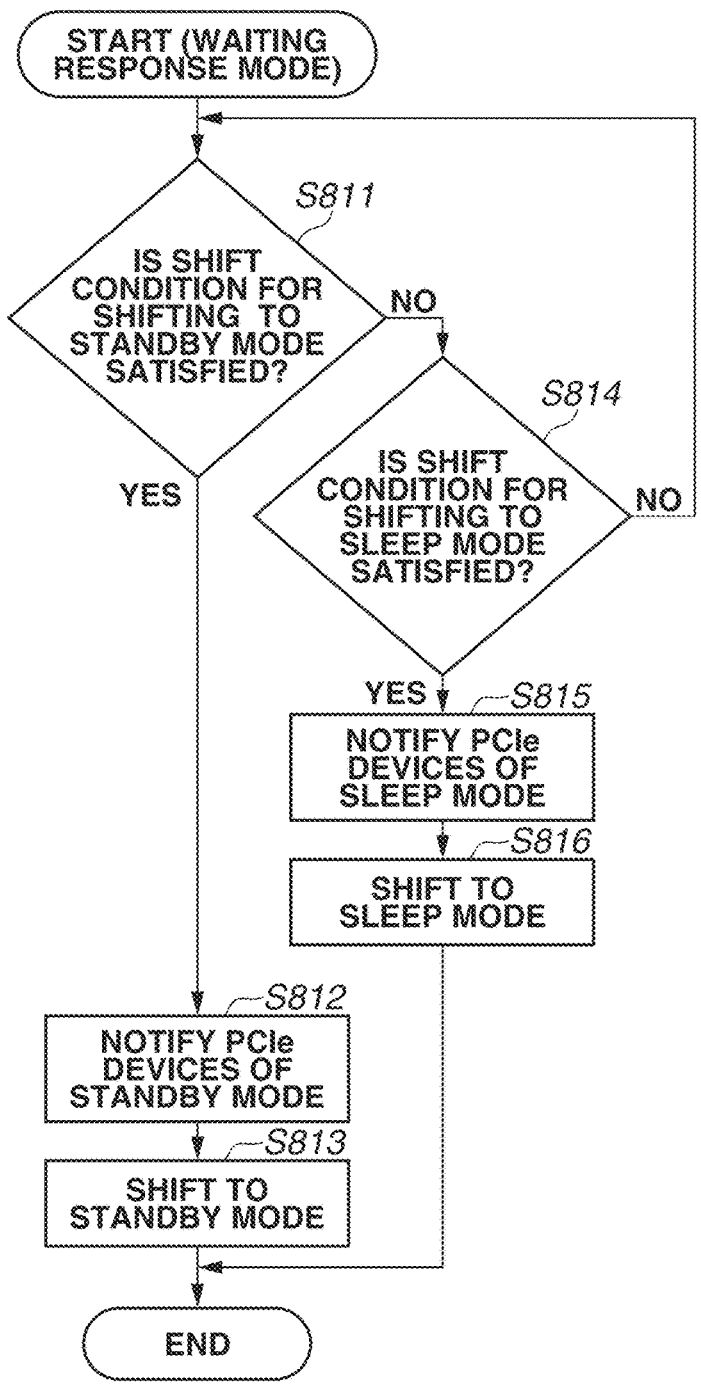

INFORMATION PROCESSING APPARATUS FOR DETERMINING LEVEL OF POWER SAVING OF PROCESSOR ACCORDING TO RETURN TIME NOTIFIED BY DEVICE CONNECTED TO PROCESSOR, AND POWER SAVING METHOD FOR PROCESSOR

CROSS-REFERENCE TO RELATED APPLICATION

This application is a continuation, and claims the benefit of U.S. patent application Ser. No. 15/599,216, filed May 18, 2017, which claims the benefit of Japanese Patent Application No. 2016-104430, filed May 25, 2016, each of which is hereby incorporated by reference herein in its entirety.

BACKGROUND OF THE INVENTION

Field of the Invention

The present disclosure relates to an information processing apparatus and the like for determining the level of the power saving of a central processing unit (CPU) according to a return time notified by a device connected to the CPU.

Description of the Related Art

To Windows 8 (registered trademark), S0ix states where a system including a CPU and a memory is in a power saving state are newly added. In the S0ix states, the CPU and the memory are in power saving states even when a system state defined by a standard regarding power control termed Advanced Configuration and Power Interface (ACPI) is an S0 state. A state with the prefix "S" indicates the power state of the system of an information processing apparatus.

In Japanese Patent Application Laid-Open No. 2015-1800, for example, in an S0i3 state, a CPU shifts to C7 to C10 states where power consumption is very small. Additionally, a memory shifts to a self-refresh mode. A state with the prefix "C" indicates the power state of the CPU. The greater the number of the C-state, the smaller the power consumption, but the longer the return time.

In a case where the power saving of the CPU and the memory is controlled in the S0ix states, it is necessary to take into account the state of a peripheral device connected to the CPU via Peripheral Component Interconnect Express (PCIe). When the peripheral device accesses the system in an S0ix state, the peripheral device needs to suspend the access until the system returns from the S0ix state to the S0 state. For example, when a network interface (I/F) receives from a network a packet for waking up the system, the system returns from the S0ix state to the S0 state. In this process, the network I/F saves, in a memory in the network I/F, the packet received from the network. Since the capacity of the memory in the network I/F is finite, the network I/F needs to discard the received packet if receiving one packet after another from the network.

Thus, the network I/F notifies an operating system (OS) of a return time based on the packet reception speed or the capacity of the memory in the network I/F. The OS determines the C-state of the CPU in the S0ix state based on the return time notified by the network I/F. The PCIe standard includes Latency Tolerance Reporting (LTR) as a mechanism for periodically notifying the OS of the return time. A device compliant with the PCIe standard (hereinafter appropriately referred to as a "PCIe device") notifies the OS of the return time. When shifting the system to the S0ix state, the OS determines the C-state of the CPU based on the return time.

In an information processing apparatus, such as a multifunction peripheral (MFP), which has many functions, such as a copy function, a print function, a scan function, and a fax function, a plurality of power modes are defined in a case where the power state of the system is the S0 state. In a print mode where printing is executed, it is necessary to supply power to a printer unit and a CPU for controlling the printer unit, but it is not necessary to supply power to a scanner unit. Further, in a scan mode where a document is read, it is necessary to supply power to the scanner unit and the CPU for controlling the scanner unit, but it is not necessary to supply power to the printer unit. In a waiting response mode where packet processing is executed on a packet transmitted from an external apparatus, it is necessary to supply power to the CPU for executing the packet processing and a network I/F for transmitting and receiving a packet. It is, however, not necessary to supply power to the printer unit and the scanner unit. As described above, a multifunction device typified by an MFP has a plurality of power modes, such as a print mode, a scan mode, and a waiting response mode, even in the S0 state where power is supplied to a CPU.

In a standby mode, such as the print mode or the scan mode, it is desirable that printing or scanning should be completed in a short time, and the operability of an operation panel should not be impaired. Thus, the CPU and a memory require high responsiveness. On the other hand, in the waiting response mode, power saving is more required than the high responsiveness of the CPU and the memory. Thus, a return time of which an OS is to be notified needs to be changed depending on the standby mode and the waiting response mode.

However, a power control application for controlling the power mode (a standby mode or a waiting response mode) of an information processing apparatus does not have a mechanism for notifying an OS of a return time. In order for the power control application operating on an application layer to notify the OS of the return time, it is necessary to modify the OS. On the other hand, a peripheral device of a CPU, for example the above-described LTR, has a mechanism for notifying the CPU of a return time.

SUMMARY OF THE INVENTION

The present disclosure is directed to providing an information processing apparatus having a new mechanism in which a device connected to a processor notifies the information processing apparatus of a return time based on information notified by an application for controlling the power mode of the information processing apparatus.

According to an aspect of the present invention, an information processing apparatus includes a processor configured to execute an operating system and a power control application, wherein the power control application operates on the operating system and controls a power mode of the information processing apparatus, and a first device connected to the processor so that the first device can communicate with the processor, and configured to notify the operating system of a return time, wherein the power control application notifies the first device of information indicating the power mode of the information processing apparatus, wherein, based on the information notified by the power control application, the first device determines a return time of which the operating system is to be notified, and notifies the operating system of the determined return time, and wherein, based on the return time notified by the first device, the operating system determines a power saving state to which the processor is to shift, and shifts the processor to the determined power saving state.

Further features of the present invention will become apparent from the following description of embodiments with reference to the attached drawings.

BRIEF DESCRIPTION OF THE DRAWINGS

FIG. 7B is a diagram illustrating a low power state in the standby mode.

FIGS. 9A, 9B, and 9C are flowcharts each illustrating processing of a power control application.

DESCRIPTION OF THE EMBODIMENTS

Figure 1:
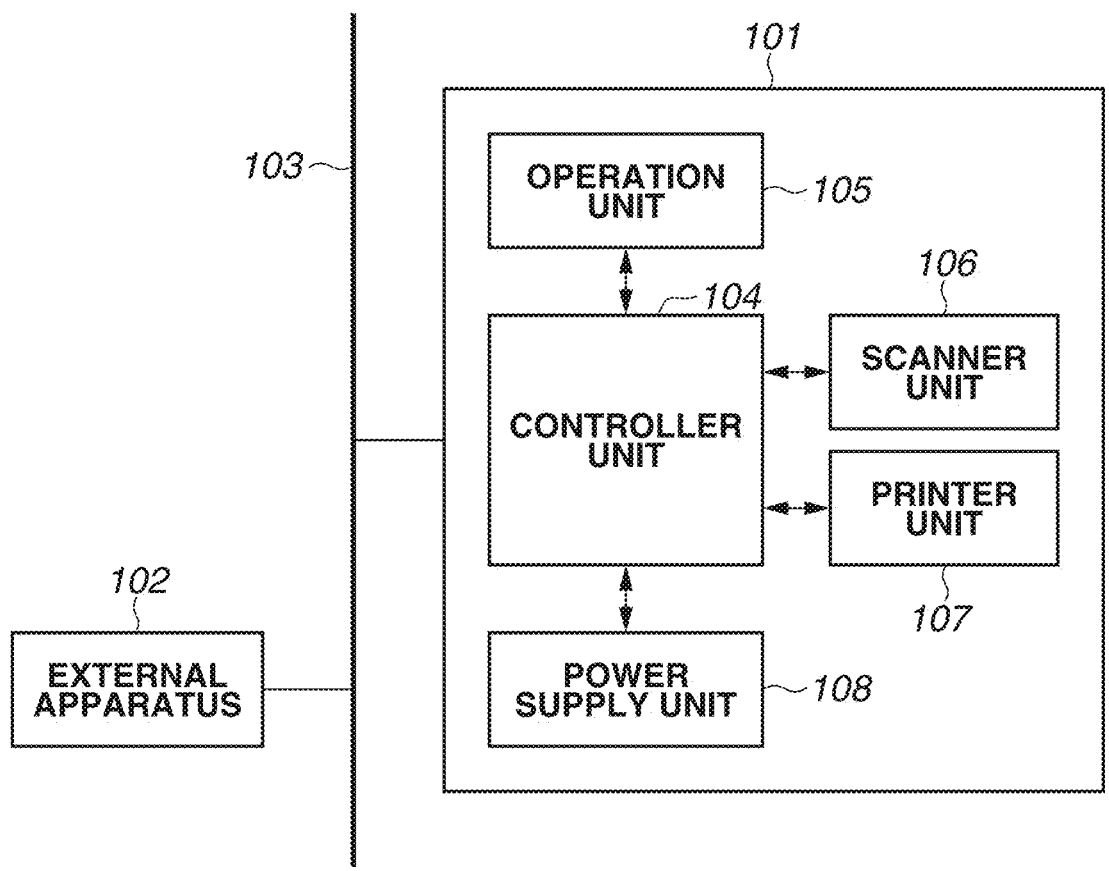
FIG. 1 is a block diagram illustrating an overall configuration of a multifunction peripheral (MFP).

FIG. 1 is a block diagram illustrating the general configuration of a multifunction peripheral (MFP) 101 according to a first embodiment.

The MFP 101 is connected to an external apparatus 102 via a network 103 so that the MFP 101 can communicate data with the external apparatus 102. The network 103 is, for example, Ethernet (registered trademark). The external apparatus 102 is a personal computer (PC) and the like and is connected to the MFP 101 so that the external apparatus 102 can communicate with the MFP 101. The MFP 101 can execute a plurality of functions, such as a copy function, a print function, a scan function, and a fax function.

The MFP 101 includes a controller unit 104, an operation unit 105, a scanner unit 106, a printer unit 107, and a power supply unit 108. The operation unit 105, the scanner unit 106, and the printer unit 107 are function units for executing the functions of the MFP 101. The controller unit 104 is a control unit for controlling the function units.

The operation unit 105 includes hardware keys, such as a numeric keypad for a user to input the number of copies to be printed, a start key for giving an instruction to start printing, and a power saving key for shifting the MFP 101 to a sleep mode. Further, the operation unit 105 includes a display unit for displaying various pieces of information. This display unit is a touch panel type display unit.

The scanner unit 106 scans an image of a document, converts the scanned image into digital data, and outputs the digital data to the controller unit 104.

The printer unit 107 forms an image on a sheet based on image data processed by the controller unit 104.

The power supply unit 108 converts an alternating voltage input to the power supply unit 108 via a power plug 208 (see FIG. 2) into a direct voltage. The power supply unit 108 supplies the converted direct voltage to each unit of the MFP 101.

Figure 2:
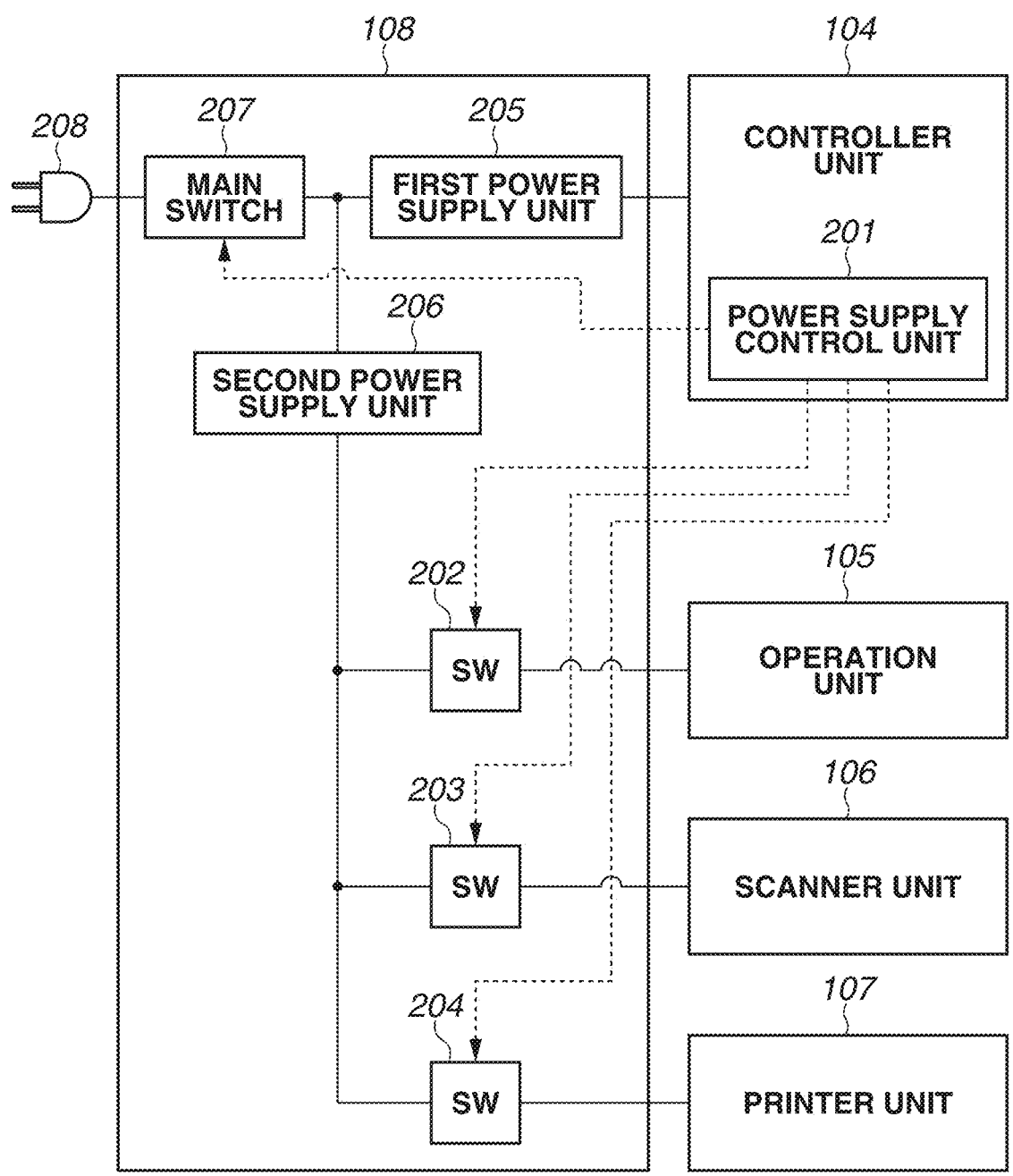
FIG. 2 is a block diagram illustrating details of a power supply unit.

FIG. 2 is a block diagram illustrating the details of the power supply unit 108.

To the power supply unit 108, an alternating voltage is input via the power plug 208. The alternating voltage input via the power plug 208 is supplied to each of a first power supply unit 205 and a second power supply unit 206. The first power supply unit 205 is, for example, an alternating-current-to-direct-current (AC/DC) converter for generating a direct voltage of about 5.0 V from the alternating voltage. Further, the second power supply unit 206 is, for example, an AC/DC converter for generating a direct voltage of about 24.0 V from the alternating voltage.

The direct voltage generated by the first power supply unit 205 is supplied to the controller unit 104. Further, the direct voltage generated by the second power supply unit 206 is supplied to the operation unit 105, the scanner unit 106, and the printer unit 107. Power generated by the first power supply unit 205 may be supplied to a portion for detecting a key input to the operation unit 105.

A main switch 207 is placed between the power plug 208 and the first power supply unit 205 and the second power supply unit 206. The main switch 207 is a rocker switch and enters an off state or an on state according to a user operation. The main switch 207 may be a tact switch.

Further, a relay switch 202 is provided between the second power supply unit 206 and the operation unit 105. Further, a relay switch 203 is provided between the second power supply unit 206 and the scanner unit 106. Further, a relay switch 204 is provided between the second power supply unit 206 and the printer unit 107.

A power supply control unit 201 of the controller unit 104 drives a solenoid (not illustrated) and thereby can move the main switch 207 from the on state to the off state. Further, the power supply control unit 201 can individually set the relay switches 202 to 204 to on or off.

Figure 3:
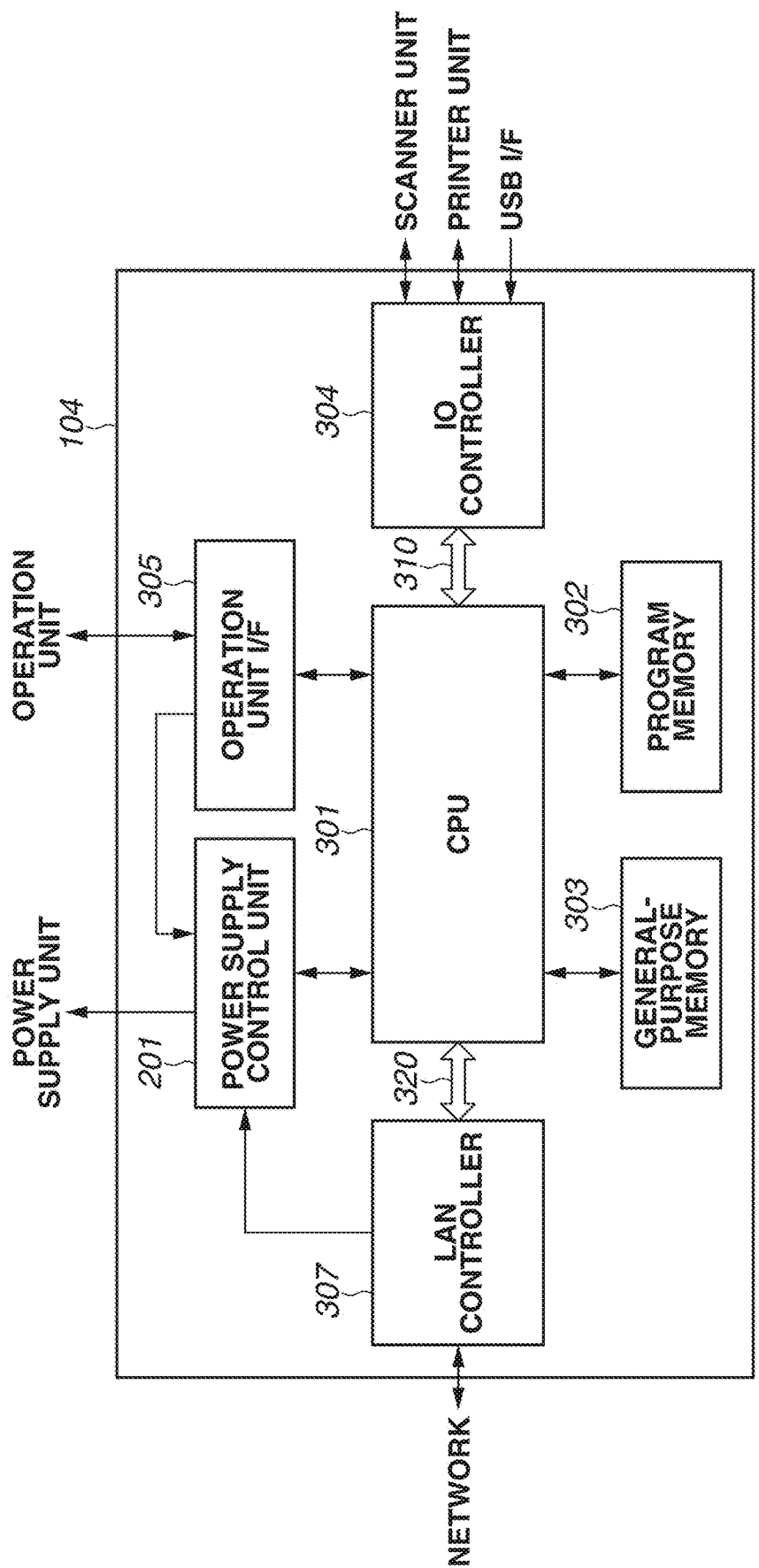
FIG. 3 is a block diagram illustrating details of a controller unit.

FIG. 3 is a block diagram illustrating the details of the controller unit 104.

The controller unit 104 includes a central processing unit (CPU) 301, a program memory 302, a general-purpose memory 303, an input/output (IO) controller (image processing unit) 304, an operation unit interface (I/F) 305, a local area network (LAN) controller (network I/F) 307, and the power supply control unit 201.

The CPU 301 is connected to the IO controller 304 via a Peripheral Component Interconnect Express (PCIe) bus 310 so that the CPU 301 can communicate with the IO controller 304. Further, the CPU 301 is connected to the LAN controller 307 via a PCIe bus 320 so that the CPU 301 can communicate with the LAN controller 307. The PCIe buses 310 and 320 are buses compliant with the PCI Express standard. The IO controller 304 and the LAN controller 307 are Peripheral Component Interconnect (PCI) devices compatible with the PCI Express standard.

The CPU 301 executes a program stored in the program memory 302, such as a flash memory. The program memory 302 stores a program for controlling the MFP 101 and control data. The CPU 301 loads a program from the program memory 302 into the general-purpose memory 303. The general-purpose memory 303 is used as a work memory of the CPU 301.

The IO controller 304 is a processor for performing image processing and is connected to the scanner unit 106 and the printer unit 107 so that the IO controller 304 can communicate with the scanner unit 106 and the printer unit 107. The IO controller 304 performs image processing on image data corresponding to an image of a document read by the scanner unit 106. Further, the IO controller 304 performs image processing on image data corresponding to an image to be printed by the printer unit 107.

The operation unit I/F 305 is an interface for connecting the operation unit 105 and the CPU 301. The operation unit I/F 305 transmits information related to an operation on a key of the operation unit 105 or an operation on the touch panel to the CPU 301. Further, the operation unit I/F 305 transmits, to the operation unit 105, screen data to be displayed on the display unit of the operation unit 105.

The LAN controller 307 is a network interface for communicating with the external apparatus 102 connected to the network 103.

The power supply control unit 201 is a logic circuit for controlling the supply of power to the components of the MFP 101. The power supply control unit 201 detects a signal input from the operation unit 105 via the operation unit I/F 305 or a signal input from the network 103 via the LAN controller 307 and returns the MFP 101 from a sleep mode. Examples of an interrupt signal input to the power supply control unit 201 include a signal from a sensor for detecting a recording sheet on which printing is to be performed by the printer unit 107, a signal from a sensor for detecting a document to be read by the scanner unit 106, and a signal from a human body detection sensor.

Figure 4:
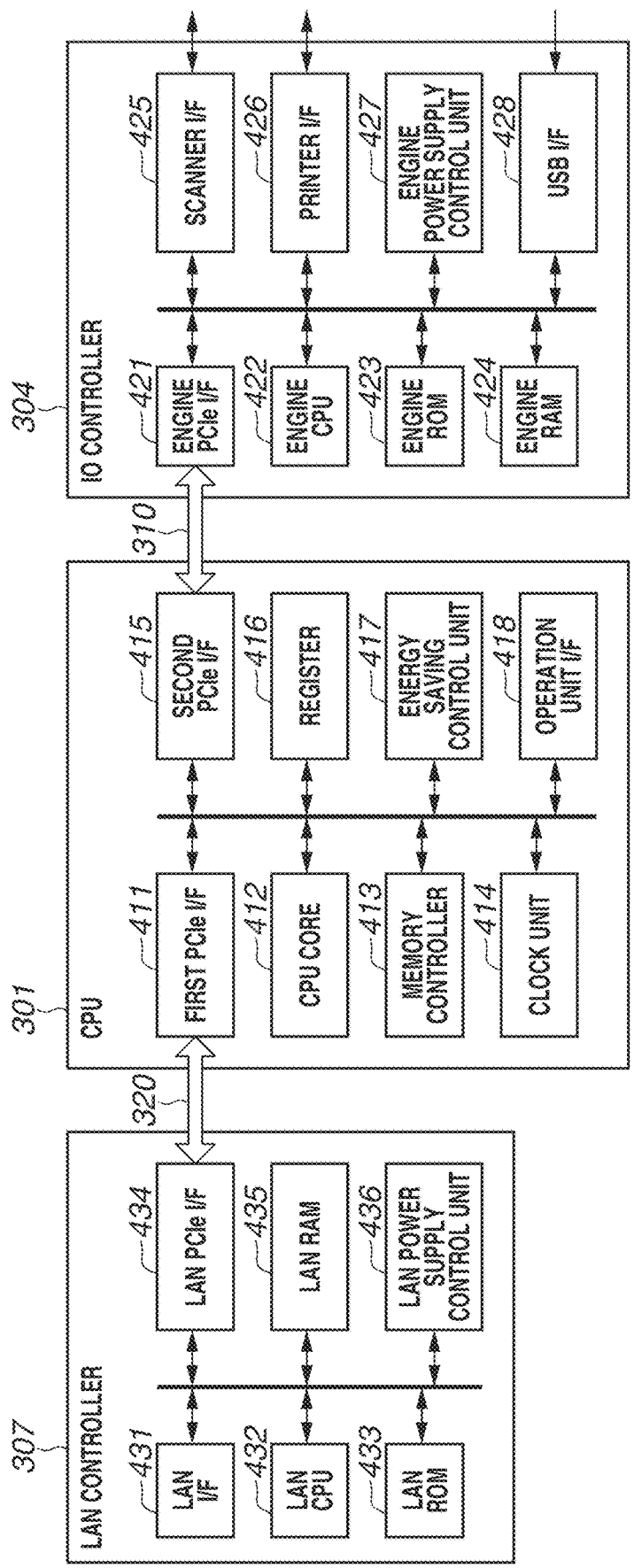
FIG. 4 is a block diagram illustrating details of a central processing unit (CPU) and Peripheral Component Interconnect (PCI) devices connected to the CPU.

FIG. 4 is a block diagram illustrating the details of the CPU 301, the IO controller 304, and the LAN controller 307.

The CPU 301 includes a first PCIe I/F 411, a CPU core 412, a memory controller 413, a clock unit 414, a second PCIe I/F 415, a register 416, an energy saving control unit 417, and an operation unit I/F 418. The first PCIe I/F 411 is an interface for communicating with the LAN controller 307 via the PCIe bus 320. The CPU core 412 executes various processes. The CPU core 412 may be a single-core or a multi-core. The memory controller 413 controls the writing of data to the general-purpose memory 303 and the reading of data from the general-purpose memory 303. The clock unit 414 is an integrated circuit (IC) for measuring the current time. The second PCIe I/F 415 is an interface for communicating with the IO controller 304 via the PCIe bus 310. The register 416 is a register for storing a return time acquired from each of peripheral devices (the IO controller 304 and the LAN controller 307) of the CPU 301. Further, the register 416 stores information indicating a C-state determined from the return time acquired from the peripheral device. The energy saving control unit 417 is a controller for controlling the supply of power to the CPU 301. When the execution status of software enters an idle state, the energy saving control unit 417 shifts the CPU 301 to the C-state indicated by the information stored in the register 416. The operation unit I/F 418 is an interface for communicating with the operation unit 105. Each of the first PCIe I/F 411 and the second PCIe I/F 415 transmits and receives data according to the PCI Express standard.

The power saving of the CPU 301 is described. An operating system (OS) executed by the CPU 301 supports C-states, which are power saving states of the CPU 301. The OS monitors the execution status of software executed by the CPU 301. If the OS detects that the execution status of software enters an idle state, the energy saving control unit 417 shifts the CPU 301 from a C0 state to a power saving state (any one of C1 to C10 states). The power saving state to which the CPU 301 is to be shifted is determined based on the minimum value of the return time saved in the register 416. The C0 state is a normal operation state. The C7, C8, C9, and C10 states, which are newly defined by S0ix states, are power saving states. As illustrated in table 1, the greater the number of the C-state, the lower the power consumption, but the longer the time until the CPU 301 returns from the power saving mode. Examples of the differences between the C7 to C10 states include as follows: with or without stopping of a clock or a cache memory, and with or without disconnection of power supply. Further, in the C7 to C10 states, the memory controller 413 and the general-purpose memory 303 shift to low power states.

TABLE 1

C-States, Power, and Return Time

| C-state | Power | Return time | State of memory |
|---------|-------|-------------|-----------------|
| C0 | 5 W | Normal operation | Normal operation |
| C7 | 200 mW | 10 μseconds | Low power state |
| C8 | 50 mW | 100 μseconds | Low power state |
| C9 | 5 mW | 1 ms | Low power state |
| C10 | 1 mW | 10 ms | Low power state |

When the CPU 301 is in the C7 to C10 states, the CPU 301 stops operating, but the peripheral devices can operate. Examples of a trigger for the CPU 301 to return from the low power state include the occurrence of an interrupt, and a return trigger for returning from a PCIe device to a PCIe host device (the CPU 301).

The IO controller 304 includes an engine PCIe I/F 421, an engine CPU 422, an engine read-only memory (ROM) 423, an engine random-access memory (RAM) 424, a scanner I/F 425, a printer I/F 426, an engine power supply control unit 427, and a Universal Serial Bus (USB) I/F 428.

The IO controller 304, which is a PCI device connected to the CPU 301 via the PCIe bus 310, is configured to shift to a D0 state (a normal power state) and a D3 state (a power saving state) where more power is saved than in the D0 state. A state with the prefix "D" indicates the device status of the PCIe device. The IO controller 304 is compatible with runtime D3. Thus, the IO controller 304 can shift to the D3 state even when the controller unit 104 is in an S0 state. The D0 state is an active state where power is supplied to all blocks in the IO controller 304. Further, the D3 state is the state where the supply of power or the clock supply to some blocks in the IO controller 304 is stopped. In the D3 state, the clock frequency to be supplied to some blocks in the IO controller 304 may be lowered. The engine power supply control unit 427 references the value of a register provided within the engine PCIe I/F 421 and controls power in the IO controller 304. The CPU 301 writes a value to a register included in the engine PCIe I/F 421 via the PCIe bus 310.

In the present embodiment, the IO controller 304 periodically executes Latency Tolerance Reporting (LTR) on the CPU 301. The IO controller 304 executes LTR to notify the CPU 301 of a return time. Based on the return time notified by the IO controller 304, the CPU 301 determines the C-state to which the CPU 301 is to shift. Specifically, if the device status is D3, the IO controller 304 notifies the CPU 301 of 20 ms. Further, if the device status is D0, and the power mode of the MFP 101 is a standby mode, the IO controller 304 notifies the CPU 301 of 9 ms. Further, if the device status is D0, and the power mode of the MFP 101 is a waiting response mode, the IO controller 304 notifies the CPU 301 of 11 ms. The power mode of the MFP 101 will be described below.

The LAN controller 307 includes a LAN I/F 431, a LAN CPU 432, a LAN ROM 433, a LAN PCIe I/F 434, a LAN RAM 435, and a LAN power supply control unit 436. The LAN controller 307, which is a PCI device, is also configured to shift to the D0 state and the D3 state. The D0 state is an active state where power is supplied to all blocks in the LAN controller 307. Further, the D3 state is the state where the supply of power or the clock supply to some blocks in the LAN controller 307 is stopped. In the D3 state, the clock frequency to be supplied to some blocks in the LAN controller 307 may be lowered.

The LAN power supply control unit 436 references the value of a register provided within the LAN PCIe I/F 434 and controls power in the LAN controller 307. The CPU 301 writes a value to a register included in the LAN PCIe I/F 434 via the PCIe bus 320.

In the present embodiment, the LAN controller 307 also periodically executes LTR on the CPU 301. The LAN controller 307 executes LTR to notify the CPU 301 of a return time. Based on the return time notified by the LAN controller 307, the CPU 301 determines the C-state to which the CPU 301 is to be shifted. Specifically, if the device status is D3, the LAN controller 307 notifies the CPU 301 of 20 ms. Further, if the device status is D0, and the power mode of the MFP 101 is the standby mode, the LAN controller 307 notifies the CPU 301 of 9 ms. Further, if the device status is D0, and the power mode of the MFP 101 is the waiting response mode, the LAN controller 307 notifies the CPU 301 of 11 ms.

The LAN controller 307 is linked to the network 103 at a link speed of 10 Mbps in the D3 state and linked to the network 103 at a link speed of 1 Gbps in the D0 state. As described above, between the D0 state (1 Gbps) and the D3 state (10 Mbps), there is a difference in time until received packets exceed the capacity of the LAN RAM 435 of the LAN controller 307. Then, in the present embodiment, the return time of which the CPU 301 is to be notified is changed between the D0 and D3 states, whereby it is possible to prevent received packets from exceeding the capacity and also set an appropriate level of power saving.

Next, LTR is described. The IO controller 304 and the LAN controller 307 connected to the CPU 301 support LTR, which is defined by the PCI Express standard. LTR indicates the return time of the CPU 301 that can be tolerated by each PCIe device. It is understood from table 1 that if the return time notified by the IO controller 304 is 9 ms, the C-state for the smallest power consumption to which the CPU 301 can shift is the C9 state.

In the present embodiment, two PCIe devices (the IO controller 304 and the LAN controller 307) are connected to the CPU 301. When a plurality of PCIe devices are thus connected, the smaller of the values of the return times acquired from the respective PCIe devices is adopted. Specifically, if the return time notified by the IO controller 304 is 5 ms, and the return time notified by the LAN controller 307 is 500 μs, 500 μs is adopted. Then, the CPU 301 selects the C8 state as the C-state.

Each PCIe device executes LTR on the CPU 301 at any timing. Specifically, the PCIe device can transmit the return time to the CPU 301 at the timing when the device status of the PCIe device is changed, or at the timing when the power mode of the MFP 101 is changed.

The return time of the IO controller 304 is saved in the engine ROM 423 of the IO controller 304. The engine CPU 422 reads the return time from the engine ROM 423 and notifies the CPU 301 of the return time via the engine PCIe I/F 421. The register 416 of the CPU 301 saves the notified return time. The register 416 may save the minimum value of the notified return time, or may save the C-state determined by the minimum value of the return time.

Figure 5:
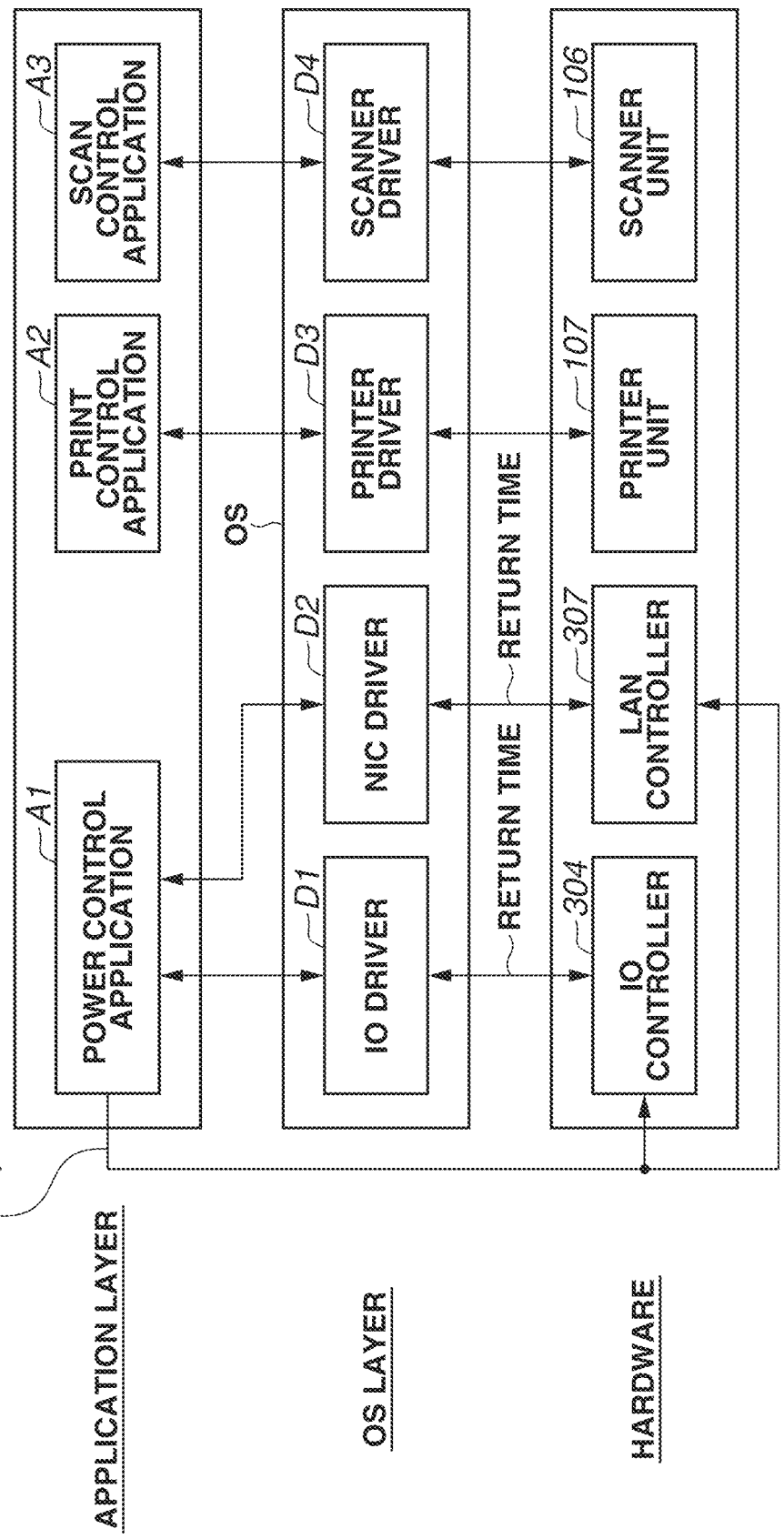
FIG. 5 is a software block diagram.

FIG. 5 is a software block diagram illustrating the configuration of software of the MFP 101.

A power control application A1, which is software for controlling the power mode of the MFP 101, operates on an application layer. The power control application A1 periodically inquires of a print control application A2 and a scan control application A3, which operate on the application layer, about the execution status of a job. The applications A1 to A3 operate on the OS. Then, the power control application A1 controls the power mode of the MFP 101 based on the execution status of the job. The CPU 301 executing the power control application A1 accesses the power supply control unit 201 and changes the power mode of the MFP 101. Then, in the present embodiment, the power control application A1 notifies the IO controller 304 and the LAN controller 307 of the power mode of the MFP 101. Paths through which the power control application A1 notifies the IO controller 304 and the LAN controller 307 of the power mode of the MFP 101 may be the PCIe buses 310 and 320, or may be out-of-band paths outside the PCIe buses 310 and 320.

Based on the power mode notified by the power control application A1, the IO controller 304 according to the present embodiment changes the return time of which the OS is to be notified. For example, if the notified power mode is the standby mode, the IO controller 304 notifies the OS of 9 ms. If the notified power mode is the waiting response mode, the IO controller 304 notifies the OS of 11 ms. Further, based on the power mode notified by the power control application A1, the LAN controller 307 also changes the return time of which the OS is to be notified. For example, if the notified power mode is the standby mode, the LAN controller 307 notifies the OS of 9 ms. If the notified power mode is the waiting response mode, the LAN controller 307 notifies the OS of 11 ms.

An IO driver D1, which controls the operation of the IO controller 304, is a device driver and operates on an OS layer. Further, a network interface card (NIC) driver D2, which controls the operation of the LAN controller 307, is also a device driver and operates on the OS layer. Further, a printer driver D3, which controls the operation of the printer unit 107, and a scanner driver D4, which controls the operation of the scanner unit 106, also operate on the OS layer.

Although not described here, software executed on the application layer and the OS layer is not only the above software. Various pieces of software, such as a memory controller for controlling the general-purpose memory 303 and a graphics driver for controlling the display of the display unit of the operation unit 105, operate on the application layer and the OS layer.

Figure 6:
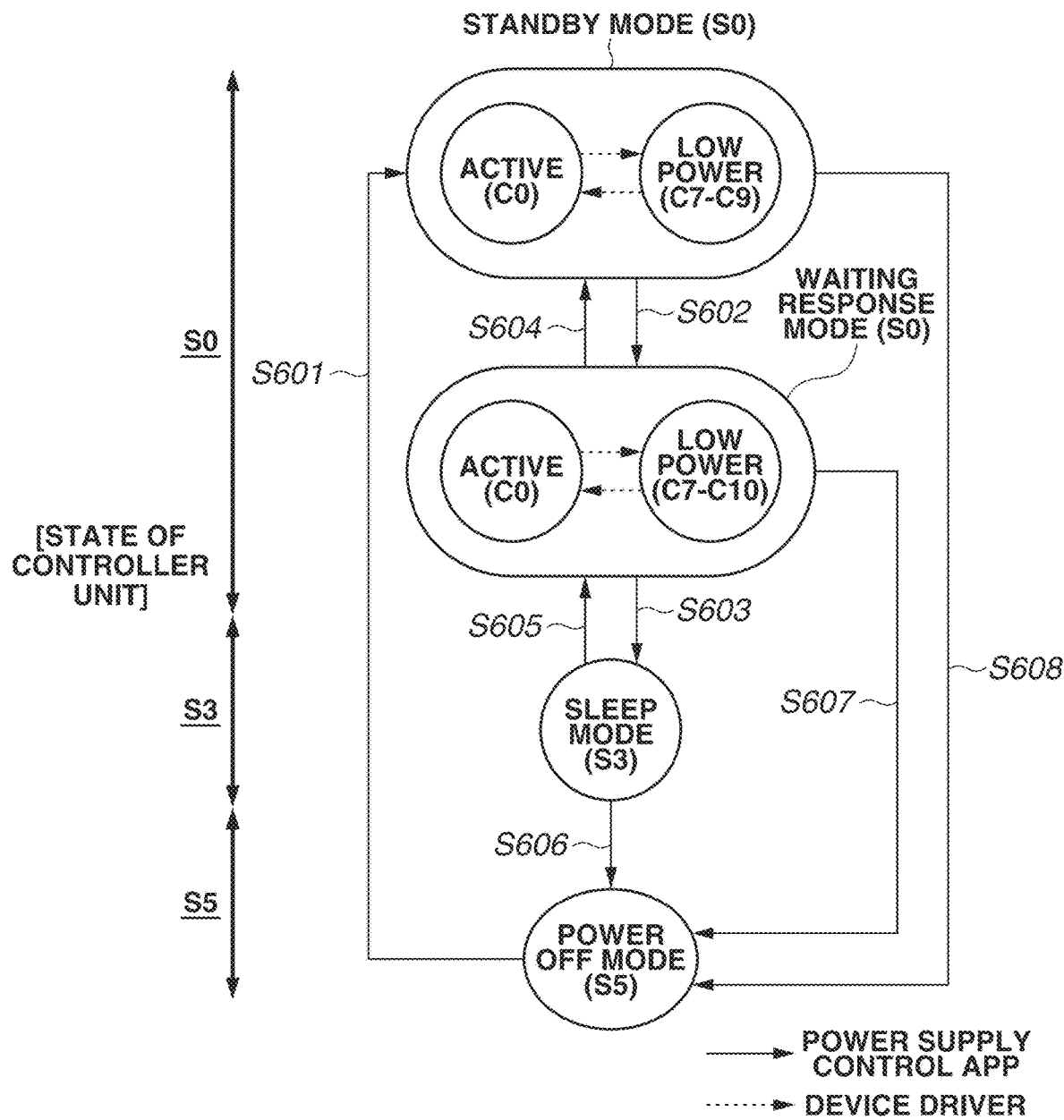
FIG. 6 is a diagram illustrating a power state of the MFP.

FIG. 6 is a diagram illustrating the power state of the MFP 101.

The MFP 101 according to the present embodiment can shift to an S0 state (an operating state), an S3 state (a sleep state), and an S5 state (a power off state), which are defined by Advanced Configuration and Power Interface (ACPI). In the present embodiment, the state where power is supplied to the CPU 301, which is the main CPU of the MFP 101, is the S0 state. Further, the state where the supply of power to the CPU 301 is stopped, but power is supplied to the general-purpose memory 303, which is the main memory, is the S3 state. Further, the state where the supply of power to the components of the MFP 101, such as the CPU 301 and the general-purpose memory 303, is stopped is the S5 state.

<S0 State>

The MFP 101 has the S0 state where the controller unit 104 is in an operating state. The MFP 101, which includes the function units, such as the printer unit 107 and the scanner unit 106, has the mode of stopping the supply of power to the printer unit 107 and the scanner unit 106 in the state where power is supplied to the CPU 301 (the S0 state). For example, when a printing process is executed, it is necessary to supply power to the CPU 301 and the printer unit 107, but it is not necessary to supply power to the scanner unit 106. On the other hand, when a scanning process is executed, it is necessary to supply power to the CPU 301 and the scanner unit 106, but it is not necessary to supply power to the printer unit 107. Further, when a response is made to an inquiry from the external apparatus 102, it is necessary to supply power to the CPU 301, but it is not necessary to supply power to the printer unit 107 and the scanner unit 106.

In the present embodiment, the MFP 101 has a standby mode (S0) where power is supplied to the printer unit 107 and the scanner unit 106 while the controller unit 104 is in the S0 state, and a waiting response mode (S0) where the supply of power to the printer unit 107 and the scanner unit 106 is stopped while the controller unit 104 is in the S0 state. If the MFP 101 is in the standby mode, power is supplied to the components (the controller unit 104, the operation unit 105, the scanner unit 106, and the printer unit 107) of the MFP 101. Further, if the MFP 101 is in the waiting response mode, power is supplied to the controller unit 104 of the MFP 101, but is not supplied to the scanner unit 106 and the printer unit 107. In the waiting response mode, the PCI devices shift to the D0 state or the D3 state.

The reason why the supply of power to the CPU 301 is not stopped in the waiting response mode (S0) is to increase the responsiveness of communication with the external apparatus 102 via the network 103. In recent years, external apparatuses 102 connected to the network 103, such as a PC, a server, and a mobile terminal, increase. Thus, the MFP 101 also should quickly perform a communication process with these external apparatuses 102. This is because the MFP 101 should perform various types of communication regarding the amount of remaining toner, the number of remaining sheets, sheet jam occurrence information, error occurrence information, the confirmation of the version of a software program, a version upgrade of a software program, and the downloading of a new program.

In the S3 state, each PCI device enters the D3 state. If the IO controller 304 enters the D3 state, the engine PCIe I/F 421, the engine CPU 422, the engine ROM 423, the engine RAM 424, the scanner I/F 425, the printer I/F 426, and the USB I/F 428 enter power saving states. Further, if the LAN controller 307 enters the D3 state, the LAN PCIe I/F 434, the LAN CPU 432, the LAN ROM 433, and the LAN RAM 435 enter power saving states.

<S3 State>

In the S0 state, power is supplied to the CPU 301 of the controller unit 104. To save power, the MFP 101 can shift to the S3 state. The S3 state is also termed a "suspend state". In the S3 state, the supply of power to the CPU 301 is stopped to save power in the MFP 101. In the S3 state, the state of the CPU 301 is saved in the general-purpose memory 303, and the general-purpose memory 303 enters a self-refresh mode. To return from the S3 state, the MFP 101 resumes using the information saved in the general-purpose memory 303 so that the MFP 101 can return more quickly than starting from a boot ROM.

In the S3 state, each PCI device enters the D3 state. If the IO controller 304 enters the D3 state, the engine PCIe I/F 421, the engine CPU 422, the engine ROM 423, the engine RAM 424, the scanner I/F 425, the printer I/F 426, and the USB I/F 428 enter power saving states. Further, if the LAN controller 307 enters the D3 state, the LAN PCIe I/F 434, the LAN CPU 432, the LAN ROM 433, and the LAN RAM 435 enter power saving states.

<S5 State>

If the main switch 207 enters the off state, the MFP 101 shifts to the S5 state where the supply of power to the MFP 101 is stopped. In the S5 state, the supply of power to the general-purpose memory 303 is also stopped in addition to the CPU 301.

Next, the transition of the power state is described in detail.

<Step S601: from S5 State to S0 State>

The power off mode (S5) is the state where the main switch 207, which is a power switch of the MFP 101, is turned off, and the supply of power to each unit is disconnected. If the main switch 207 enters the on state, the MFP 101 shifts to the standby mode (S0). The standby mode (S0) is the state where power is supplied to all the units of the MFP 101, and the state where various jobs, such as a copy job and a print job, are executed, or the state where the jobs can be immediately executed.

<Step S602: from S0 State (Standby Mode) to S0 State (Waiting Response Mode)>

The waiting response mode (S0) is the state where the relay switches 202 to 204 of the power supply unit 108 are turned off, and the supply of power to the scanner unit 106, the printer unit 107, and the operation unit 105 is stopped. On the other hand, the first power supply unit 205 supplies power to part of the controller unit 104 and the operation unit 105. Both the standby mode and the waiting response mode are the S0 state.

Table 2 illustrates shift conditions for shifting from the standby mode (S0) to the waiting response mode (S0).

TABLE 2

| Shift Conditions for Shifting from Standby Mode (S0) to Waiting Response Mode (S0) | |
|---|---|
| Shift condition | Description |
| Time lapse | When predetermined time elapses |
| Operation unit switch pressing | When power saving switch of operation unit 105 is pressed |
| Clock setting | When set time arrives |

If any one of the conditions including "time lapse", "operation unit switch pressing", and "clock setting" is satisfied, the MFP 101 shifts from the standby mode (S0) to the waiting response mode (S0).

In the shift conditions in table 2, "time lapse" is the case where the time elapsed since an operation on the operation unit 105 ends or the time elapsed since a job ends exceeds a predetermined time. The predetermined time can be set to a time from several minutes to several hours by the user. "Operation unit switch pressing" is the case where the user presses the power saving key (not illustrated) of the operation unit 105. "Clock setting" is the case where the time set in advance by the user arrives.

<Step S603: from S0 State to S3 State>

The sleep mode (S3) is the state where the supply of power to the CPU 301 and the IO controller 304 is further stopped in the power state in the waiting response mode (S0). The sleep mode (S3) is a low power state where power is supplied to only portions necessary to return the MFP 101 from the sleep mode (S3) to the standby mode (S0) or the waiting response mode (S0). In the S3 state, unlike the S0 state, the supply of power to the CPU 301 is stopped. Specifically, in the sleep mode (S3), power is supplied to only the general-purpose memory 303, the operation unit I/F 305, the power supply control unit 201, and the LAN controller 307 in FIG. 3. Further, the general-purpose memory 303 shifts to the refresh mode. While the supply of power to the CPU 301 remains stopped, the LAN controller 307 responds to an inquiry from the external apparatus 102 about a content that can be handled by the LAN controller 307. This is referred to as a "proxy response". In the sleep mode (S3), the LAN controller 307 and the IO controller 304, which are PCI devices, are in the D3 state.

Table 3 illustrates shift conditions for shifting from the waiting response mode (S0) to the sleep mode (S3).

TABLE 3

Shift Conditions for Shifting from Waiting Response Mode (S0) to Sleep Mode (S3)

| Shift condition | Description |
| --- | --- |
| Time lapse | When predetermined time elapses |
| End of processing of job other than print job | After inquiry is received from external apparatus 102 and MFP 101 shifts from sleep mode (S3) to waiting response mode (S0), and when processing in response to inquiry ends |

If either one of the conditions including "time lapse" and "end of processing of job other than print job" is satisfied, the MFP 101 shifts from the waiting response mode (S0) to the sleep mode (S3).

In the shift conditions in table 3, "time lapse" is the case where the time elapsed since the execution of a job is completed exceeds a predetermined time. The predetermined time can be set to a time from several minutes to several hours by the user. "End of processing of job other than print job" is the case where a response to an inquiry from the external apparatus 102 via the network 103 ends.

<Step S604: from S0 State (Waiting Response Mode) to S0 State (Standby Mode)>

Table 4 illustrates return conditions for returning from the waiting response mode (S0) to the standby mode (S0).

TABLE 4

Return Conditions for Returning from Waiting Response Mode (S0) to Standby Mode (S0)

| Return condition | Description |
| --- | --- |
| Operation unit switch pressing | When power saving switch of operation unit 105 is pressed |
| Job reception | When print job, etc., is received from network 103 |
| Clock setting | When set time arrives |
| USB device detection | In a case where USB device is detected at USB I/F 428, or in a case where USB device detects return trigger |

If any one of the conditions including "operation unit switch pressing", "job reception", "clock setting", and "USB device detection" is satisfied, the MFP 101 shifts from the waiting response mode (S0) to the standby mode (S0).

In the return conditions in table 4, "operation unit switch pressing" is the case where the user presses the power saving key (not illustrated) of the operation unit 105. If the power saving key is pressed by the user, a signal from the power saving key of the operation unit 105 is detected by the CPU 301 via the operation unit I/F 305. Further, "job reception" is the case where a print job is received from the external apparatus 102 via the network 103. "Clock setting" is the case where the current time measured by the clock unit 414 reaches the time set in advance. "USB device detection" is the case where the connection of a USB device to the USB I/F 428 is detected, or the case where a USB device already connected to the USB I/F 428 detects a return trigger. Examples of the return trigger detected by the USB device include the case where an authentication card reader, which is a USB device, detects a card, and the case where a camera device or a human detection sensor, which is a USB device, detects a person. The return conditions are not limited to the above conditions, and may also include the case where a document detection sensor of the scanner unit 106 detects a document placed on a document platen, and the case where a sheet placed in a manual-bypass tray of the printer unit 107 is detected.

<Step S605: from S3 State to S0 State>

Table 5 illustrates return conditions for returning from the sleep mode (S3) to the waiting response mode (S0) or the standby mode (S0).

TABLE 5

Return Conditions for Returning from Sleep Mode (S3) to Waiting Response Mode (S0) or Standby Mode (S0)

| Return condition | Description |
| --- | --- |
| Operation unit switch pressing | When power saving switch of operation unit 105 is pressed |
| Print job reception | When print job is received from network 103 |
| Reception of job other than print job | When job or inquiry for not performing printing is received from network 103 |
| Clock setting | When set time arrives |

If any one of the conditions including "operation unit switch pressing", "print job reception", "reception of job other than print job", and "clock setting" is satisfied, the MFP 101 returns from the sleep mode (S3) to the waiting response mode (S0).

In the return conditions in table 5, "operation unit switch pressing" is the case where the user presses the power saving key (not illustrated) of the operation unit 105. If the power saving key is pressed by the user, a signal from the power saving key of the operation unit 105 is detected by the CPU 301 via the operation unit I/F 305. "Print job reception" is the case where a print job is received from the external apparatus 102 via the network 103. "Clock setting" is the case where the current time measured by the clock unit 414 reaches the time set in advance. "Reception of job other than print job" is the case where a job (an inquiry job) which inquires of the external apparatus 102 about information (hereinafter, "device information") of the MFP 101 via the network 103 and to which the LAN controller 307 cannot make a proxy response is received.

If any one of the return conditions is detected in the sleep mode (S3), an interrupt signal is input to the power supply control unit 201. If the interrupt signal is input to the power supply control unit 201, the power supply control unit 201 performs control so that power is supplied to the CPU 301 and the program memory 302. The CPU 301 to which power is supplied performs a resume process using the information saved in the general-purpose memory 303. Further, the power supply control unit 201 supplies power to the function units based on the type of the interrupt signal. Specifically, if an interrupt signal regarding a print job is input to the power supply control unit 201, the power supply control unit 201 supplies power to the printer unit 107 in addition to the CPU 301 and the general-purpose memory 303. On the other hand, if an inquiry is received, or if the power saving key is pressed, or if the set time arrives, the power supply control unit 201 supplies power to the CPU 301 and the general-purpose memory 303, but does not supply power to the printer unit 107.

<Step S606: from S3 State to S5 State>

Table 6 illustrates shift conditions for shifting from the sleep mode (S3) to the power off mode (S5).

TABLE 6

Shift Conditions for Shifting from Sleep Mode (S3) to Power Off Mode (S5)

| Shift condition | Description |
|---|---|
| Main switch pressing | When main switch is pressed |
| Time lapse | When predetermined time elapses in sleep mode |

If either one of the conditions including "main switch pressing" and "time lapse" is satisfied, the MFP 101 shifts from the sleep mode (S3) to the power off mode (S5).

In the shift conditions in table 6, "main switch pressing" is the case where the user moves the main switch 207 to the off state. Further, "time lapse" is the case where a predetermined time elapses in the sleep mode (S3). The predetermined time can be set to a time from several minutes to several hours by the user.

<Steps S607 and S608: from S0 State to S5 State>

If the user moves the main switch 207 to the off state when the MFP 101 is in the S0 state, the MFP 101 shifts to the power off mode (S5). The power off mode (S5) may be a suspend state (S3 of the ACPI standard) or a hibernation state (S4 of the ACPI standard).

Next, the power control of the PCI devices is described.

In the present embodiment, the PCI devices are the IO controller 304 and the LAN controller 307, which are connected to the CPU 301 via the PCIe buses 310 and 320. In the present embodiment, the PCI devices are compatible with runtime D3. The PCI devices can transition between the D0 and D3 states even when the controller unit 104 is in the S0 state. Then, in the present embodiment, if the MFP 101 is in the standby mode (S0), the PCI devices remain in the D0 state and are prohibited from shifting to the D3 state. Further, if the MFP 101 is in the waiting response mode (S0), the PCI devices are controlled to transition between the D0 and D3 states.

Table 7 illustrates the correspondence between the power mode of the MFP 101 and the power states of the PCI devices. As illustrated in table 7, the MFP 101 controls the power states of the PCI devices based on the power mode of the MFP 101.

TABLE 7

Power States of PCI Devices (IO Controller 304 and LAN Controller 307)

| | | Power states of devices | |
|---|---|---|---|
| | | D0 | D3 |
| Power state of MFP 101 | Standby mode | o | x |
| | Waiting response mode | At time of response | o |
| | Sleep mode | x | o |
| | Power off mode | Off | Off |

As illustrated in table 7, when the power mode of the MFP 101 is the standby mode (S0), the PCI devices are in the D0 state. When the power mode of the MFP 101 is the sleep mode (S3), the PCI devices are in the D3 state. Further, when the power mode of the MFP 101 is the power off mode (S5), the supply of power to the PCI devices is stopped.

As described above, in the present embodiment, if the power mode of the MFP 101 is the standby mode (S0), the PCI devices connected to the MFP 101 via the PCIe buses 310 and 320 are prohibited from shifting to the D3 state. The PCI devices according to the present embodiment support runtime D3, in which the PCI devices shift to the D3 state in the S0 state. In the present embodiment, however, the PCI devices remain in the D0 state in the standby mode (S0) so that the responsiveness when a job is executed is heightened.

Then, in the present embodiment, when the MFP 101 is in the waiting response mode (S0), the PCI devices transition between the D0 and D3 states. The D0 state of the PCI devices in the waiting response mode (S0) and the D0 state of the PCI devices in the standby mode (S0) are the same state. In the waiting response mode (S0), however, unlike the standby mode (S0), the supply of power to the scanner unit 106 and the printer unit 107 is stopped.

Table 8 illustrates a shift condition for the PCI devices to shift from the D0 state to the D3 state in the waiting response mode (S0).

TABLE 8

Shift Condition for PCI Devices (Waiting Response Mode)

| Shift condition | Description |
|---|---|
| Time lapse | When power mode of MFP 101 is waiting response mode, and predetermined time elapses with PCI devices in idle states |

The shift condition for the PCI devices to shift from the D0 state to the D3 state is "time lapse", which is the case where the power mode of the MFP 101 is the waiting response mode (S0), and a predetermined time elapses with the PCI devices in idle states. The PCI devices transition between the D0 and D3 states more frequently than a change in the power mode of the MFP 101. The predetermined time can be set to a time from several seconds to several milliseconds.

Next, table 9 illustrates return conditions for the PCI devices to return from the D3 state to the D0 state in the waiting response mode (S0).

TABLE 9

Return Conditions for PCI Devices (Waiting Response Mode)

| Return condition | Description |
| --- | --- |
| At time of CPU return trigger detection | When CPU 301 detects return trigger |
| At time of device return trigger detection | When devices detect return trigger |

The conditions for the PCI devices to return from the D3 state to the D0 state include the case where the CPU 301 detects a return trigger, and the case where the PCI devices detect a return trigger. That is, in the D3 state, the PCI devices can return to the D0 state according to both the CPU 301 and the PCI devices.

"At time of CPU return trigger detection" illustrated in table 9 is the time when the CPU 301 detects a return trigger. This corresponds to, for example, the time when the power state of the MFP 101 changes from the waiting response mode to the standby mode. Specifically, when the power control application A1 changes the power state of the MFP 101 from the waiting response mode to the standby mode, the device drivers executed by the CPU 301 shift the PCI devices from the D3 state to the D0 state. Further, when the settings of the PCI devices are changed, or when device information of the PCI devices is acquired, the device drivers access the PCI devices. In this process, the device drivers shift the PCI devices from the D3 state to the D0 state. For example, there is a case where information is transmitted from the LAN controller 307 to the external apparatus 102 via the network 103 at a predetermined time. If the current time measured by the clock unit 414 reaches the predetermined time, an interrupt signal is input to the CPU 301. If the interrupt signal is input to the CPU 301, the CPU 301 rewrites the values of the registers of the PCI devices. Consequently, the PCI devices return from the D3 state to the D0 state. As a result, the LAN controller 307 can transmit information to the external apparatus 102.

Further, "at time of device return trigger detection" illustrated in table 9 is the case where the PCI devices detect a return trigger. For example, examples of this case include the case where the LAN controller 307 receives data from the external apparatus 102 via the network 103, and the case where the USB I/F 428 detects a USB device. If each PCI device detects a return trigger, the PCI device outputs an interrupt signal to the CPU 301 through an out-of-band path (outside the PCIe bus). If the interrupt signal is input to the CPU 301, the CPU 301 rewrites the values of the registers of the PCI devices. Consequently, the PCI devices return from the D3 state to the D0 state.

Figure 7A:
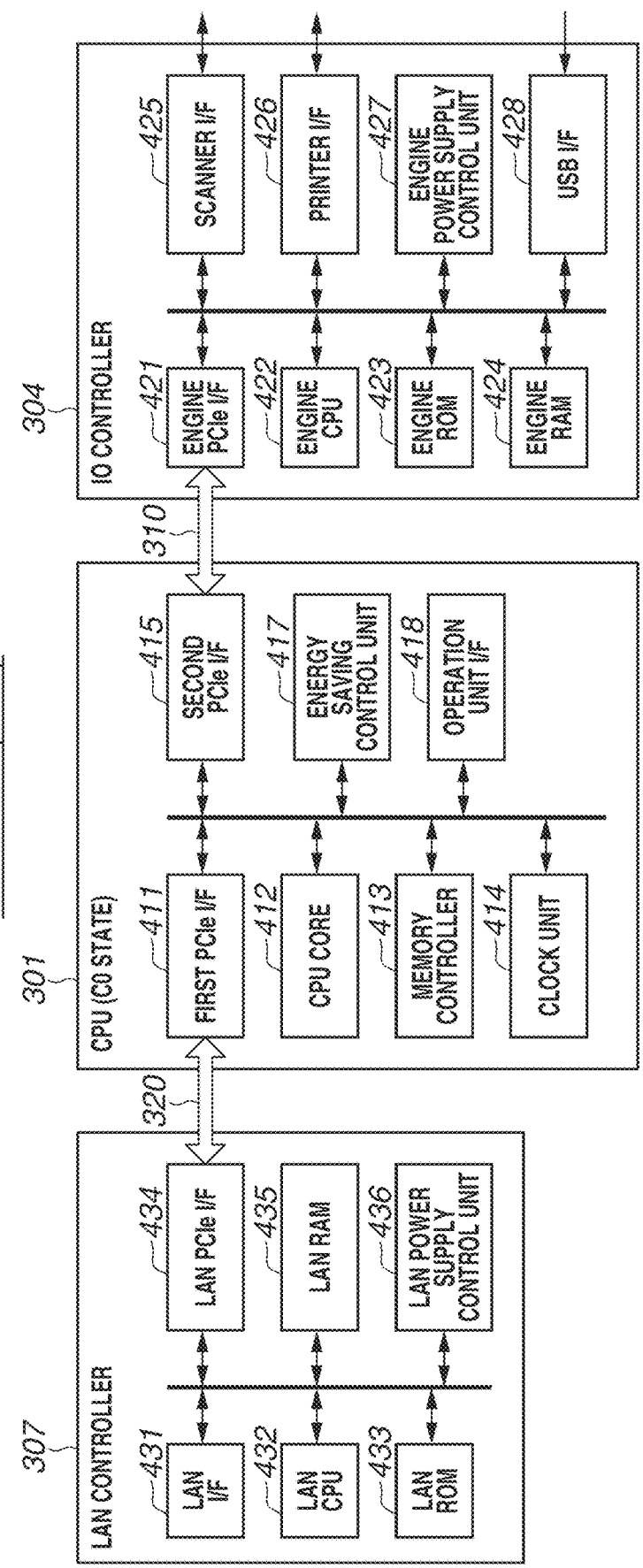
FIG. 7A is a diagram illustrating an active state in a standby mode.

FIG. 7A is a diagram illustrating an active state in the standby mode (S0). FIG. 7B is a diagram illustrating a low power state in the standby mode (S0).

<Standby Mode (Active State)>

In the active state, as illustrated in FIG. 7A, the CPU 301 is in the C0 state, and the PCI devices are in the D0 state. Specifically, in the active state, power is supplied to the components in the CPU 301, the components in the IO controller 304, and the components in the LAN controller 307. In the standby mode, power is supplied to the function units, such as the printer unit 107 and the scanner unit 106, which are connected to the IO controller 304.

<Standby Mode (Low Power State)>

Further, in the low power state, as illustrated in FIG. 7B, the CPU 301 is in any one of the C7 to C9 states, and the PCI devices are in the D0 state. The CPU 301 does not shift to the C10 state. The general-purpose memory 303, which is connected to the CPU 301, is in a self-refresh state. In the low power state, the CPU core 412 and the memory controller 413 of the CPU 301 are in power saving states. A power saving state is any one of the stopping of power supply, the stopping of clock supply, and a reduction in the frequency of clock supply. In the low power state, the IO controller 304 and the LAN controller 307 are in normal power states.

<Waiting Response Mode (Active State)>

Figure 8A:
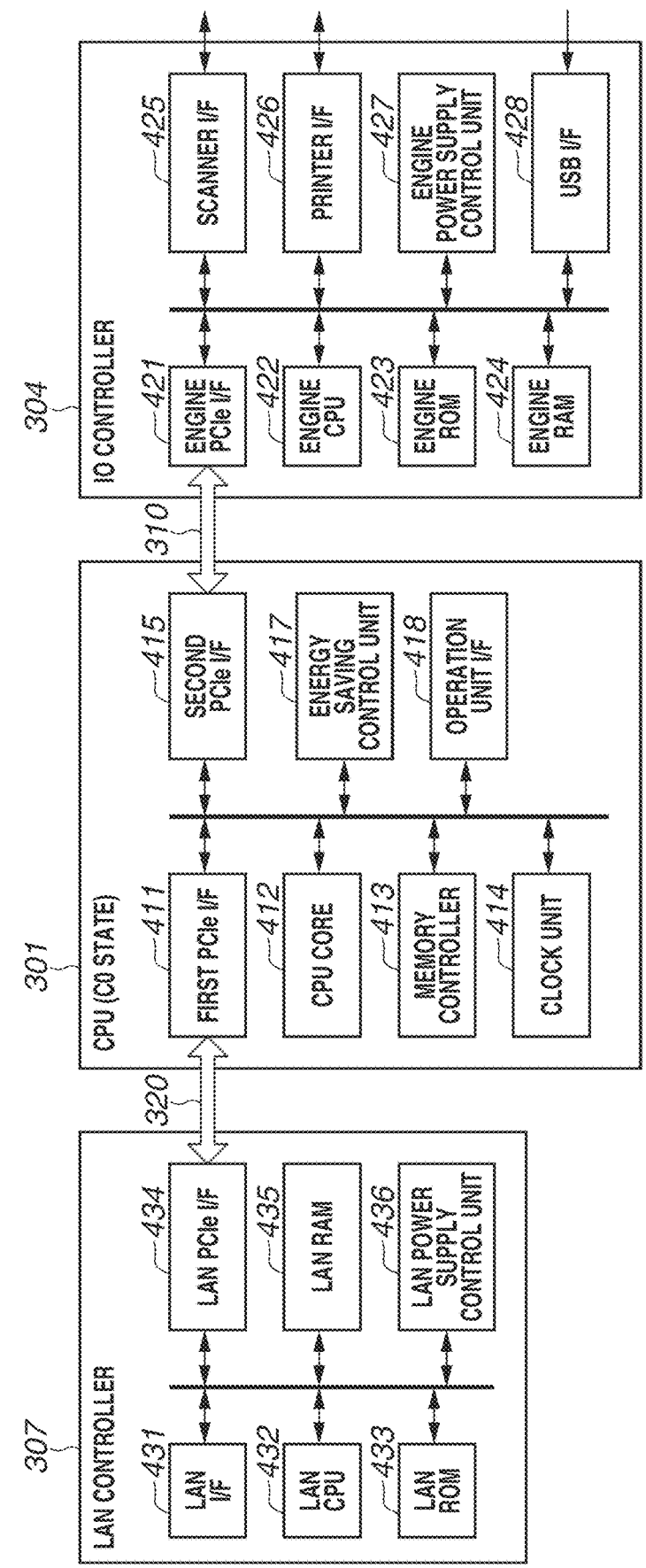
FIG. 8A is a diagram illustrating an active state in a waiting response mode.

In the active state, as illustrated in FIG. 8A, the CPU 301 is in the C0 state, and the PCI devices are in the D0 state. Specifically, in the active state, power is supplied to the components in the CPU 301, the components in the IO controller 304, and the components in the LAN controller 307. In the waiting response mode, the supply of power to the function units, such as the printer unit 107 and the scanner unit 106, which are connected to the IO controller 304, is stopped.

<Waiting Response Mode (Low Power State)>

Figure 8B:
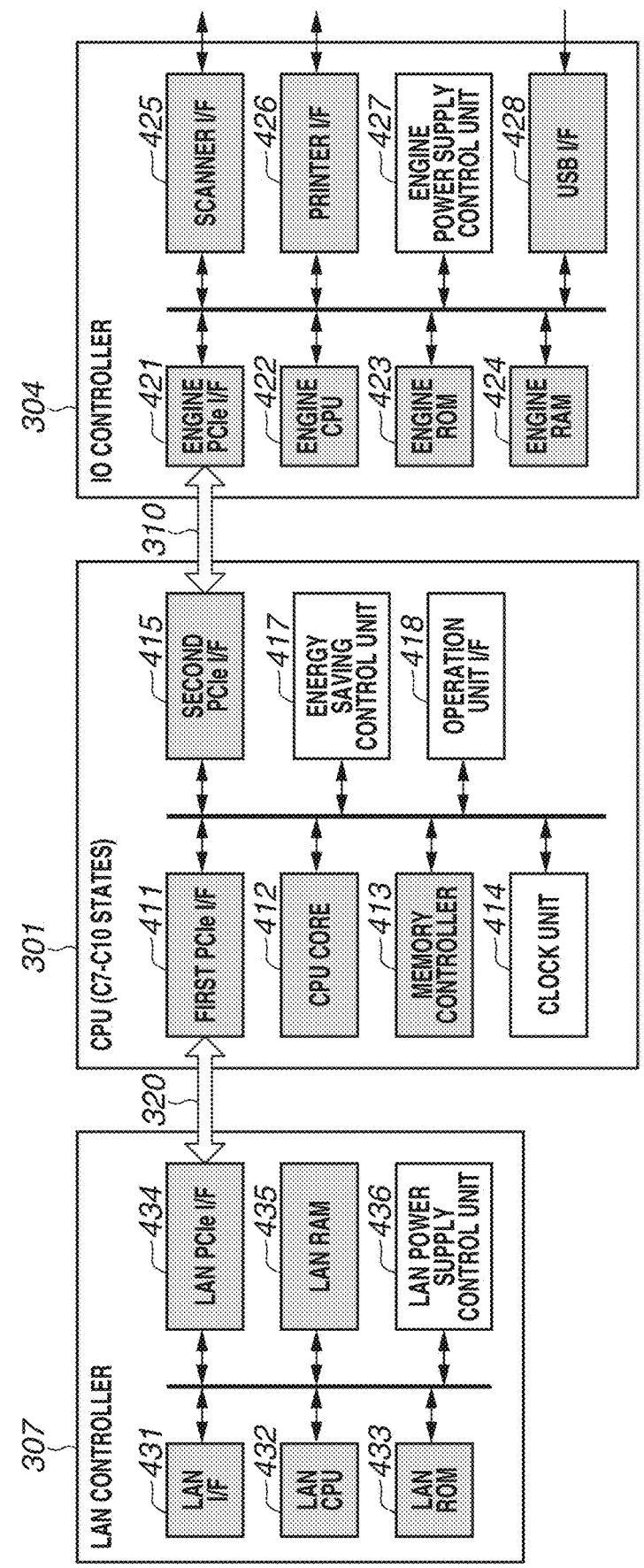
FIG. 8B is a diagram illustrating a low power state in the waiting response mode.

Further, in the low power state, as illustrated in FIG. 8B, the CPU 301 is in any one of the C7 to C10 states, and the PCI devices are in the D3 state. In the low power state in the waiting response mode, the CPU 301 can shift to the C10 state. The general-purpose memory 303, which is connected to the CPU 301, is in a self-refresh state. The power states of the other components are similar to those in the low power state in the standby mode, and therefore are not described here.

As described above, the power mode of the MFP 101 is controlled by the power control application A1 on the application layer, whereas the C-state of the CPU 301 is controlled by the OS. Thus, the OS does not distinguish between the control of the C-state of the CPU 301 in the standby mode and the control of the C-state of the CPU 301 in the waiting response mode. If, however, the CPU 301 is lowered to the C10 state in the standby mode, a delay may occur in a response to an operation of the user on an operation panel, which results in discomfort to the user. Thus, in the standby mode, the state of the CPU 301 may be limited such that the lower limit is the C9 state, for example. On the other hand, in the waiting response mode, power saving is more expected than a response to a user operation. Thus, there is no issue if the CPU 301 shifts to the C10 state. Thus, the present embodiment provides a mechanism for reflecting the power mode of the MFP 101 controlled by the power control application A1, which is software on the application layer, on the control of the C-state of the CPU 301, which is executed by the OS.

A description is given of a mechanism for, based on the power mode of the MFP 101 controlled by the power control application A1, changing the return time of which each PCIe device is to notify the CPU 301. The power control application A1, however, is software executed on the application layer, and does not have a mechanism for notifying the OS of a return time. This mechanism can be achieved by modifying the OS. This is, however, not realistic in that it is difficult to perform confirmation involved in the modification of the OS, and it is troublesome to confirm the operation with respect to each version upgrade of the OS. In response, in the present embodiment, the OS is notified of a return time using a mechanism (LTR) defined by the PCI Express standard between the PCIe devices and the CPU 301.

Specifically, as illustrated in FIG. 5, the power control application A1 notifies the IO controller 304 and the LAN controller 307 of the power mode (the standby mode or the waiting response mode). Based on the notified power mode, the IO controller 304 determines the return time of which the OS is to be notified. Then, the IO controller 304 executes LTR and notifies the OS of the return time via the PCIe bus 310. In this case, an example has been described where the power control application A1 notifies the IO controller 304 of the power mode through an out-of-band path (outside the PCIe bus 310). Alternatively, the power control application A1 may notify the IO controller 304 of the power mode through an in-band path (the PCIe bus 310).

Further, similarly, based on the notified power mode, the LAN controller 307 determines the return time of which the OS is to be notified. Then, the LAN controller 307 executes LTR to notify the OS of the return time via the PCIe bus 320.

Figure 9C:
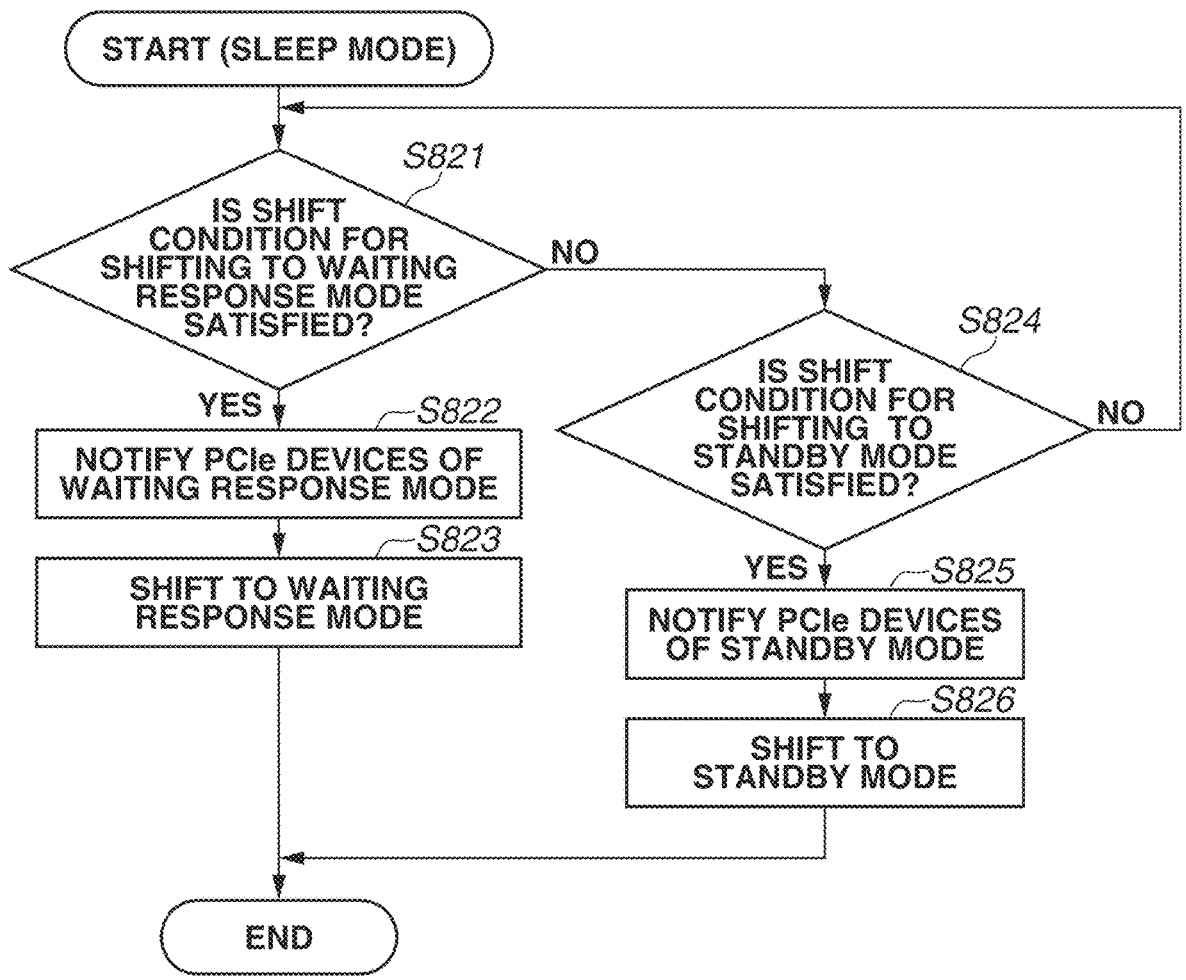

FIGS. 9A to 9C are flowcharts illustrating the processing of the power control application A1. The CPU 301 executing the power control application A1 executes processes in the flowcharts in FIGS. 9A to 9C.

As illustrated in FIG. 9A, if the MFP 101 is in the standby mode (S0), then in step S801, the CPU 301 determines whether a shift condition for shifting to the waiting response mode is satisfied. The shift condition for shifting to the waiting response mode corresponds to the conditions in table 2. If it is determined that any one of the shift conditions for shifting to the waiting response mode is satisfied (YES in step S801), then in step S802, the CPU 301 notifies the PCIe devices (the IO controller 304 and the LAN controller 307) of information indicating the waiting response mode. Then, in step S803, the CPU 301 controls the power supply control unit 201 to stop supplying power to the printer unit 107 and the scanner unit 106. Consequently, the MFP 101 shifts to the waiting response mode (S0).

As illustrated in FIG. 9B, if the MFP 101 is in the waiting response mode (S0), then in step S811, the CPU 301 determines whether a shift condition for shifting to the standby mode is satisfied. The shift condition for shifting to the standby mode corresponds to the conditions in table 4. If it is determined that any one of the shift conditions for shifting to the standby mode is satisfied (YES in step S811), then in step S812, the CPU 301 notifies the PCIe devices of information indicating the standby mode. Then, in step S813, the CPU 301 controls the power supply control unit 201 to supply power to the printer unit 107 and the scanner unit 106, whereby the MFP 101 shifts to the standby mode (S0).

If it is determined that none of the shift conditions for shifting to the standby mode is satisfied (NO in step S811), then in step S814, the CPU 301 determines whether a shift condition for shifting to the sleep mode (S3) is satisfied. The shift condition for shifting to the sleep mode corresponds to the conditions in table 3. If it is determined that either one of the shift conditions for shifting to the sleep mode is satisfied (YES in step S814), then in step S815, the CPU 301 notifies the PCIe devices of information indicating the sleep mode. Then, in step S816, the CPU 301 controls the power supply control unit 201 to stop supplying power to the CPU 301, and shifts the MFP 101 to the sleep mode (S3).

As illustrated in FIG. 9C, if the MFP 101 is in the sleep mode (S3), and if any one of the return conditions in table 5 is detected, the power supply control unit 201 supplies power to the CPU 301. The CPU 301 to which power is supplied confirms a return condition latched in the power supply control unit 201. In step S821, the CPU 301 determines whether the confirmed return condition is a return condition for returning to the waiting response mode. The return condition for returning to the waiting response mode corresponds to the conditions other than "print job reception" in table 5. If it is determined that any one of the return conditions for returning to the waiting response mode is satisfied (YES in step S821), then in step S822, the CPU 301 notifies the PCIe devices of information indicating the waiting response mode. Then, in step S823, the CPU 301 shifts the MFP 101 to the waiting response mode (S0).

If it is determined that the confirmed return condition is not a return condition for returning to the waiting response mode, but a return condition for returning to the standby mode (NO in step S821, YES in step S824), then in step S825, the CPU 301 notifies the PCIe devices of information indicating the standby mode. Then, in step S826, the CPU 301 performs control so that power is supplied to the printer unit 107 and the scanner unit 106, whereby the MFP 101 shifts to the standby mode (S0). The return condition for returning to the standby mode is "print job reception" in table 5. Thus, power may not be supplied to the scanner unit 106.

Figure 10:
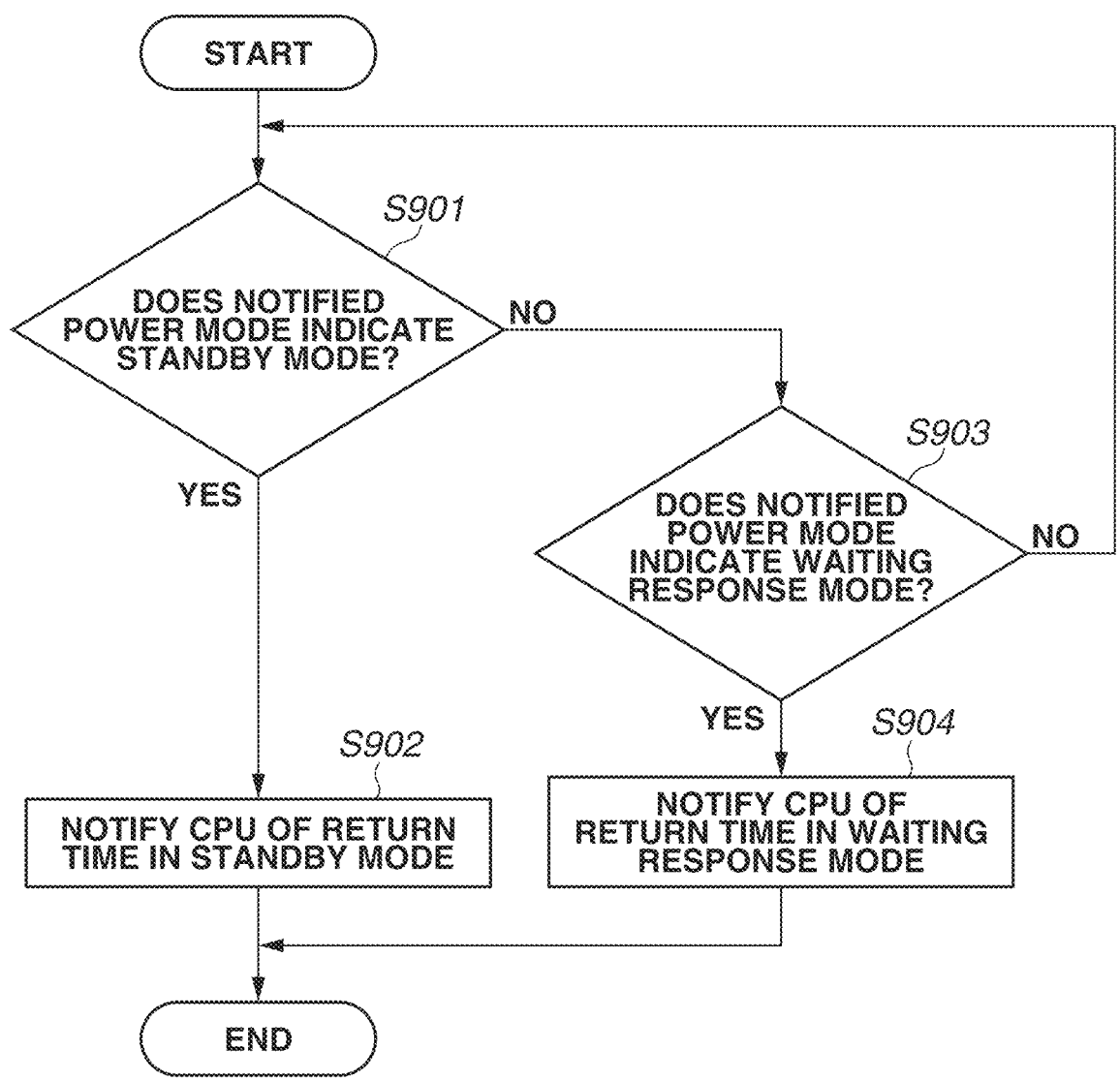
FIG. 10 is a flowchart illustrating an operation of an input/output (IO) controller.

FIG. 10 is a flowchart illustrating the processing of the PCIe devices. A description is given of the processing executed by the IO controller 304. The engine CPU 422 of the IO controller 304 executes processes in the flowchart in FIG. 10.

In step S901, the engine CPU 422 determines whether the power mode notified by the power control application A1 indicates the standby mode. If the power mode notified by the power control application A1 indicates the standby mode (YES in step S901), then in step S902, the engine CPU 422 references table 10 and notifies the CPU 301 of a return time (9 ms) in the standby mode. If the power mode notified by the power control application A1 indicates the waiting response mode (YES in step S903), then in step S904, the engine CPU 422 references table 10 and notifies the CPU 301 of a return time (11 ms) in the waiting response mode. In table 10, the power mode of the MFP 101 and a return time are stored in association with each other. If the power mode notified by the power control application A1 indicates the sleep mode (NO in step S903), the engine CPU 422 does not notify the CPU 301 of a return time. If the MFP 101 is to shift to the sleep mode, the CPU 301 will be turned off. Thus, the engine CPU 422 does not notify the CPU 301 of a return time.

TABLE 10

Mode Change Conditions and Return Time in First Embodiment

| Mode after change | Return time | Power state of CPU |
| --- | --- | --- |
| Waiting response mode | 11 ms | C0 to C10 |
| Standby mode | 9 ms | C0 to C9 |
| Sleep mode | No change | Power off |
| Power off | No change | Power off |

If the power mode of the MFP 101 is to shift to the waiting response mode, there is no issue if the C-state is C10, which is the deepest C-state. Thus, the return time is 11 ms, which is a value equal to or greater than 10 ms, in which the CPU 301 can shift to C10. If the power mode of the MFP 101 is to shift to the standby mode, then to limit the C-state to the C9 state, the return time is 9 ms, which is a value less than or equal to 10 ms, in which the CPU 301 cannot shift to C10. The C-state cannot be used in the sleep mode and the power off mode, and therefore, the return time is not changed.

Based not only on the power mode notified by the power control application A1 but also on the device status of the IO controller 304, the IO controller 304 determines the return time of which the CPU 301 is to be notified. For example, the return time is changed according to the presence or absence of a link in the USB I/F 428. As illustrated in table 11, if there is no link in the USB I/F 428, the engine CPU 422 notifies the CPU 301 of a return time (300 ms). If there is a link, the engine CPU 422 notifies the CPU 301 of a return time based on the power mode of the MFP 101. If there is a link, the return time is made short so that a reception buffer does not become full while the CPU 301 is returning. In contrast, if there is no link, there is no possibility that the reception buffer becomes full. Thus, the return time is made long so that the CPU 301 can shift to the C10 state.

TABLE 11

Presence or Absence of Link in USB I/F
428 and Return Time in First Embodiment

| Presence or absence of link | Return time |
|---|---|
| Link present | 11 ms (waiting response mode)/9 ms (standby mode) |
| Link absent | 300 ms |

When there is no link, the return time is 300 ms. Thus, the CPU 301 can shift to the C10 state. However, when there is a link, the return time is 0.5 ms. Thus, the CPU 301 is limited to the C8 state.

As described above, in the present embodiment, the return time of which the CPU 301 is to be notified is changed according to the power mode of the MFP 101, whereby it is possible to control the CPU 301 to enter an appropriate C-state in each power mode. That is, in the standby mode where responsiveness is required, it is possible to control the CPU 301 to enter C0 to C9. In the waiting response mode where power saving is required, it is possible to control the CPU 301 to enter C0 to C10.

In the first embodiment, an example has been described where the IO controller 304 is notified, through an in-band or out-of-band path, of the power mode notified by the power control application A1. In a second embodiment, an example is described where the IO controller 304 is also notified of the power mode of which the CPU 301 notifies the power supply control unit 201.

Figure 11:
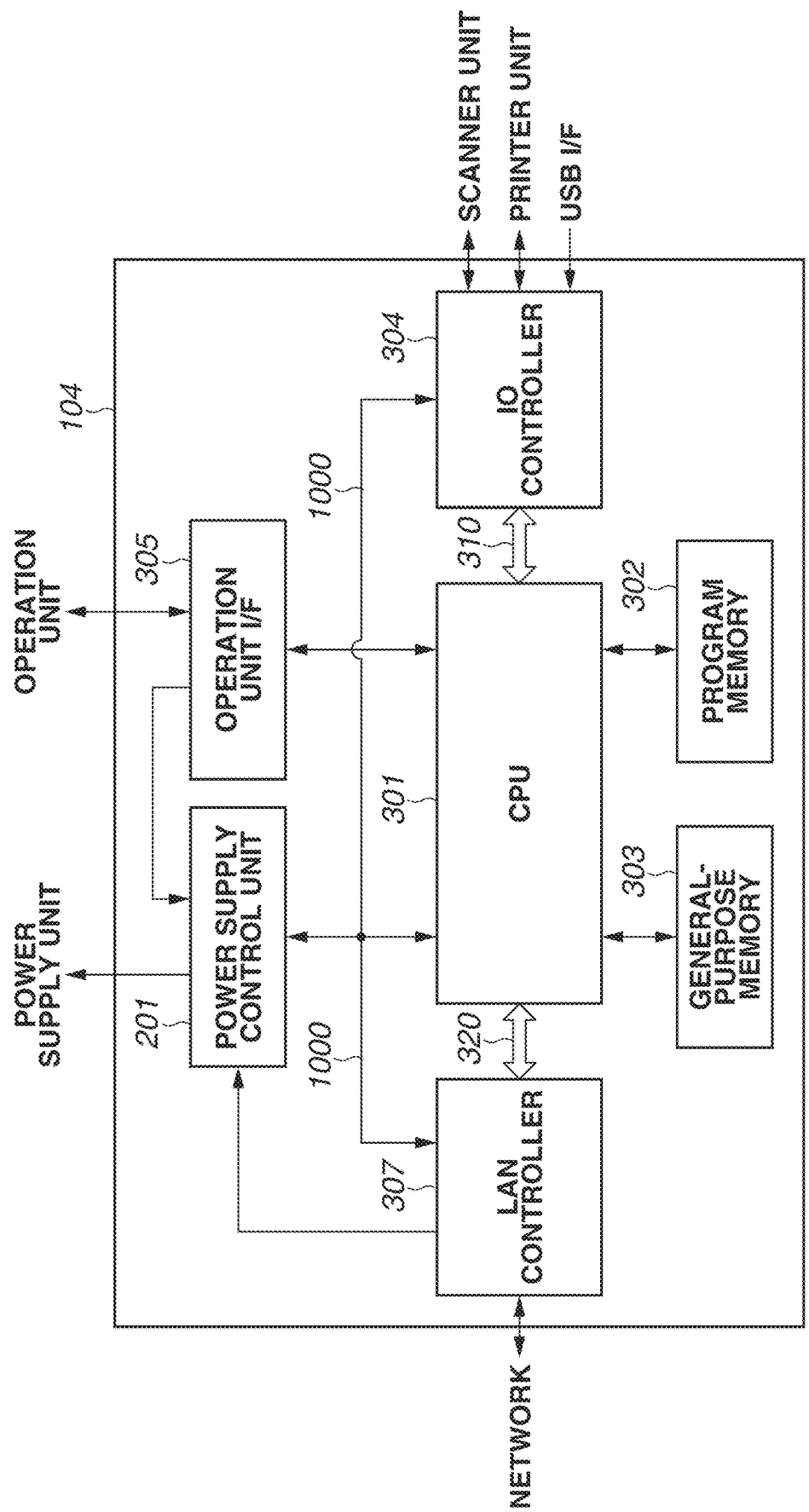
FIG. 11 is a block diagram illustrating details of a controller unit according to a second embodiment.

In the second embodiment, as illustrated in FIG. 11, among power control signals output from the CPU 301 to the power supply control unit 201, a signal indicating the standby mode (hereinafter, a "mode signal 1000") is also input to the IO controller 304. Based on the signal level of the mode signal 1000, the engine CPU 422 changes the return time of which the CPU 301 is to be notified. The relationship between the signal level of the mode signal 1000 and the return time of which the CPU 301 is to be notified is as illustrated in the following table 12.

TABLE 12

Level of Mode Signal 1000 and Return
Time in Second Embodiment

| Mode | Signal level | Return time |
|---|---|---|
| Standby mode | H | 9 ms |
| Waiting response mode | L | 11 ms |

As described above, in the second embodiment, the CPU 301 changes the return time using the mode signal 1000 indicating the power mode of the MFP 101. It is possible to change the return time without adding a new signal output from the CPU 301.

In the above embodiments, a case has been described where the IO controller 304 and the LAN controller 307, which are connected to the CPU 301 based on the PCI Express standard, execute LTR to notify the CPU 301 of return times. Embodiments are not limited to LTR, which is defined by the PCI Express standard. Alternatively, for example, a USB device may notify the CPU 301 of a return time using Latency Tolerance Message (LTM), which is defined by the USB standard.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

What is claimed is:

1. An information processing apparatus comprising:
a processor configured to execute a power control application to control a power mode of the information processing apparatus and execute a device driver for a PCIe (Peripheral Component Interconnect Express) device configured to communicate with the processor via a PCIe bus; and
the PCIe device,
wherein the power control application executed by the processor is configured to notify the PCIe device of the power mode of the information processing apparatus, and
wherein, when the PCIe device receives the power mode of the information processing apparatus, the PCIe device then notifies the device driver executed by the processor of return time information via the PCIe bus, and the processor shifts to a power state determined based on at least the return time information.

2. The information processing apparatus according to claim 1, wherein the PCIe device is a first PCIe device, the information processing apparatus further comprising a second PCIe device configured to communicate with the processor via a PCIe bus,
wherein the power control application executed by the processor is configured to notify, the first PCIe device and the second PCIe device of the power mode of the information processing apparatus, and
wherein, when the first PCIe device and the second PCIe device receive the power mode of the information processing apparatus, the first PCIe device and the second PCIe device notifies the device driver executed by the processor of return time information via the PCIe bus, and the processor shifts to a power state determined based on at least the return time information from the first PCIe device and the return time information from the second PCIe device.

3. The information processing apparatus according to claim 2, wherein the second PCIe device is a network interface configured to receive data from an external apparatus via a network.

4. The information processing apparatus according to claim 3, wherein, based on the power mode of the information processing apparatus and a device status of the second PCIe device, the second PCIe device notifies the processor of return time information.

5. The information processing apparatus according to claim 1, wherein the PCIe device includes a universal serial bus (USB) interface and, based on presence or absence of a link to the USB interface, notifies the device driver executed by the processor of the return time information.

6. The information processing apparatus according to claim 2, wherein the processor shifts to the power state determined based on a shorter time among the return time information from the first PCIe device and the return time information from the second PCIe device.

7. The information processing apparatus according to claim 1,
wherein, in a case where the power mode indicates a first power mode, the PCIe device notifies the processor of first return time information, and
wherein, in a case where the power mode information indicates a second power mode where more power is saved than in the first power mode, the PCIe device notifies the processor of second return time information indicating a longer time than the first return time information.

8. The information processing apparatus according to claim 1, wherein the PCIe device notifies the device driver executed by the processor of the return time information via the PCIe bus.

9. The information processing apparatus according to claim 1, wherein the PCIe device executes Latency Tolerance Reporting (LTR) to notify the device driver executed by the processor of the return time information.

10. The information processing apparatus according to claim 1, wherein the PCIe device has a table in which the power mode of the information processing apparatus is associated with the return time information.

11. The information processing apparatus according to claim 1, further comprising a printing unit configured to perform printing.

12. The information processing apparatus according to claim 11, wherein the PCIe device is an image processing unit configured to execute image processing on an image to be printed by the printing unit.

13. The information processing apparatus according to claim 12,
wherein, in a case where a device status of the PCIe device is a normal power state, the PCIe device notifies, based on the power mode of the information processing apparatus, first return time information, and
wherein, in a case where the device status of the PCIe device is a power saving state where more power is saved than in the normal power state, the PCIe device notifies, based on the power mode of the information processing apparatus, second return time information.

14. The information processing apparatus according to claim 1, wherein, based on at least the power mode of the information processing apparatus and a device status of the PCIe device, the PCIe device notifies the return time information.

15. A power control method for an information processing apparatus having a processor configured to execute a power control application to control a power mode of the information processing apparatus and execute a device driver for a PCIe (Peripheral Component Interconnect Express) device configured to communicate with the processor via a PCIe bus, the power control method comprising:
notifying, by the power control application executed by the processor, the PCIe device of the power mode of the information processing apparatus;
notifying, by the PCIe device when the PCIe device receives the power mode of the information processing apparatus, the device driver executed by the processor of return time information via the PCIe bus; and
shifting the processor to a power state determined based on at least the return time information.

* * * * *